(12) United States Patent
Kurasawa

(10) Patent No.: US 10,635,242 B2
(45) Date of Patent: Apr. 28, 2020

(54) DISPLAY DEVICE WITH TOUCH DETECTION FUNCTION, METHOD FOR DRIVING DISPLAY DEVICE WITH TOUCH DETECTION FUNCTION, AND ELECTRONIC APPARATUS

(71) Applicant: Japan Display Inc., Tokyo (JP)

(72) Inventor: Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 220 days.

(21) Appl. No.: 14/108,896

(22) Filed: Dec. 17, 2013

(65) Prior Publication Data

US 2014/0192012 A1    Jul. 10, 2014

(30) Foreign Application Priority Data

Jan. 8, 2013    (JP) .................. 2013-001381

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ........ G06F 3/041; G06F 3/044; G06F 3/0412; G06F 3/0416
See application file for complete search history.

(56) References Cited

U.S. PATENT DOCUMENTS

| | | | |
|---|---|---|---|
| 2011/0267293 A1* | 11/2011 | Noguchi et al. | ............... 345/173 |
| 2012/0050659 A1* | 3/2012 | Nakanishi et al. | ............ 349/139 |
| 2014/0253493 A1* | 9/2014 | Cho | ....................... G06F 3/0412 345/174 |

FOREIGN PATENT DOCUMENTS

| | | |
|---|---|---|
| JP | 2011-233018 | 11/2011 |
| JP | 2012-047807 | 3/2012 |

* cited by examiner

*Primary Examiner* — William Boddie
*Assistant Examiner* — Alecia D English
(74) *Attorney, Agent, or Firm* — K&L Gates LLP

(57) ABSTRACT

According to an aspect, a display device with a touch detection function includes a drive electrode driver and a source selector unit. The drive electrode driver applies a touch driving signal to a drive electrode opposed only to a pixel electrode corresponding to a non-selection signal line in which the application of the pixel signal is not selected by the source selector unit, among pixel electrodes selected by one scanning signal by the gate driver.

9 Claims, 18 Drawing Sheets

- 543 DISPLAY UNIT
- 542 KEYBOARD
- 541 BODY

- 551 UPPER HOUSING
- 554 DISPLAY DEVICE
- 552 LOWER HOUSING

UPPER HOUSING
551

552
LOWER HOUSING

552
LOWER HOUSING

551
UPPER HOUSING

LOWER HOUSING 552
553 CONNECTING PART
551 UPPER HOUSING

UPPER HOUSING 551
552 LOWER HOUSING

DISPLAY DEVICE WITH TOUCH DETECTION FUNCTION, METHOD FOR DRIVING DISPLAY DEVICE WITH TOUCH DETECTION FUNCTION, AND ELECTRONIC APPARATUS

CROSS REFERENCES TO RELATED APPLICATIONS

The present application claims priority to Japanese Priority Patent Application JP 2013-001381 filed in the Japan Patent Office on Jan. 8, 2013, the entire content of which is hereby incorporated by reference.

BACKGROUND

1. Technical Field

The present disclosure relates to a display device that can detect an external proximity object, specifically, a display device with a touch detection function that can detect an external proximity object based on a change in capacitance, a method for driving the display device with a touch detection function, and an electronic apparatus.

2. Description of the Related Art

In recent years, a touch detection device that can detect an external proximity object, what is called a touch panel, has been attracting attention. The touch panel is used for a display device with a touch detection function that is mounted on or integrated with a display device such as a liquid crystal display device. The display device with a touch detection function displays various button images and the like on the display device, so that information can be input using the touch panel instead of an ordinary mechanical buttons. The display device with a touch detection function having such a touch panel does not need an input device such as a keyboard, a mouse, and a keypad, so that the use thereof tends to expand to a personal digital assistant such as a cellular phone, in addition to a computer.

Examples of a type of the touch detection device include, but are not limited to, an optical type, a resistance type, an electrostatic capacitance type, and the like. When the electrostatic capacitance type touch detection device is used for a portable terminal apparatus and the like, devices having a relatively simple structure and low power consumption can be provided. For example, an electrostatic capacitance type touch panels are disclosed in Japanese Patent Application Laid-open Publication No. 2011-233018 (JP-A-2011-233018) and Japanese Patent Application Laid-open Publication No. 2012-047807 (JP-A-2012-047807).

As a technique for reducing a thickness of a display device with a touch detection function, known is that a drive electrode for display also functions as a drive electrode for touch detection, for example. In such a case, a display period and a touch detection period are separately provided because in the display period in which a scanning signal is applied from a gate driver, a display driving signal and a touch driving signal cannot be applied to the drive electrode simultaneously.

Although not limited to the above configuration, when the thickness of the display device with a touch detection function is reduced, a distance between a signal line and a touch detection electrode is reduced. Accordingly, when the display and the touch detection are performed at the same time in the same region, the display of the display device may affect the touch detection of the touch detection device in some cases.

However, to achieve a large screen size and high definition in the display device, time required for the display by the display device is increased. Therefore, in a case in which the screen size or the definition of the display device is increased, the display period of the display device is relatively increased and the touch detection period of the touch detection device cannot be secured enough, so that the display device with a touch detection function cannot sufficiently perform the touch detection and may be weak against a noise and the like. The display devices with a touch detection function disclosed in JP-A-2011-233018 and JP-A-2012-047807 do not take the fact into account that the display period of the display device is relatively increased and the touch detection period of the touch detection device cannot be secured enough, so that the touch detection cannot be sufficiently performed and can be weak against noise and the like.

For the foregoing reasons, there is a need for a display device with a touch detection function, a method for driving the display device with a touch detection function, and an electronic apparatus that can secure the touch detection period sufficiently while suppressing the influence of the display by the display device on the touch detection.

SUMMARY

According to an aspect, a display device with a touch detection function includes a substrate; a plurality of pixel electrodes arranged in a matrix above a plane parallel to the substrate; a plurality of signal lines that extend above a plane parallel to a surface of the substrate and supply a pixel signal for displaying an image to the plurality of pixel electrodes; a display function layer that exerts an image display function based on the pixel signal; a plurality of drive electrodes that are opposed to the plurality of pixel electrodes in a vertical direction orthogonal to the surface of the substrate, and are arranged to be scanned in a direction different from a direction along which the plurality of signal lines extend; a plurality of touch detection electrodes that are opposed to the plurality of drive electrodes in the vertical direction and capacitively coupled with the plurality of drive electrodes; a gate driver that applies a scanning signal for selecting the plurality of pixel electrodes; a drive electrode driver that applies a touch driving signal for touch detection to the plurality of drive electrodes; a source driver that applies the pixel signal to the plurality of pixel electrodes; and a source selector unit that selects a signal line to which the source driver applies the pixel signal among the plurality of signal lines. The drive electrode driver applies the touch driving signal to a drive electrode opposed only to a pixel electrode corresponding to a non-selection signal line in which the application of the pixel signal is not selected by the source selector unit, among pixel electrodes selected by one scanning signal by the gate driver.

According to another aspect, a method for driving a display device with a touch detection function, the method includes, in a period in which a plurality of pixel electrodes are selected by one scanning signal by a gate driver, applying a display driving signal for display to a drive electrode when an application of a pixel signal to a signal line is selected by a source selector unit; applying a touch driving signal for touch detection to the drive electrode when application of the pixel signal to the signal line is not selected by the source selector unit; and outputting a touch detection signal corresponding to an external proximity object approaching from the outside from a plurality of touch detection electrodes three-dimensionally crossing the plurality of drive electrodes and forming capacitance at the three-dimensionally crossing portion.

According to another aspect, an electronic apparatus has a display device with a touch detection function capable of detecting an external proximity object. The display device with a touch detection function includes: a substrate; a plurality of pixel electrodes arranged in a matrix above a plane parallel to the substrate; a plurality of signal lines that extend above a plane parallel to a surface of the substrate and supply a pixel signal for displaying an image to the plurality of pixel electrodes; a display function layer that exerts an image display function based on the pixel signal; a plurality of drive electrodes that are opposed to the plurality of pixel electrodes in a vertical direction orthogonal to the surface of the substrate, and are arranged to be scanned in a direction different from a direction along which the plurality of signal line extend; a plurality of touch detection electrodes that are opposed to the drive electrodes in the vertical direction and capacitively coupled with the plurality of drive electrodes; a gate driver that applies a scanning signal for selecting the plurality of pixel electrodes; a drive electrode driver that applies a touch driving signal for touch detection to the plurality of drive electrodes; a source driver that applies the pixel signal to the plurality of pixel electrodes; and a source selector unit that selects a signal line to which the source driver applies the pixel signal among the plurality of signal lines. The drive electrode driver applies the touch driving signal to a drive electrode opposed only to a pixel electrode corresponding to a non-selection signal line in which the application of the pixel signal is not selected by the source selector unit, among pixel electrodes selected by one scanning signal by the gate driver.

Additional features and advantages are described herein, and will be apparent from the following Detailed Description and the figures.

DETAILED DESCRIPTION

The following describes preferred embodiments of the present disclosure in detail with reference to drawings. The present disclosure is not limited by contents of the embodiments described below. Components described below include a component that can be easily conceivable by those skilled in the art and a component that is substantially the same. The components described below may be appropriately combined. The description will be held in the order as follows.

1. Embodiments (display device with a touch detection function)
  1-1. First embodiment
  1-2. Second embodiment
  1-3. Third embodiment
2. Application example (electronic apparatus)

An example in which the display device with a touch detection function according to the embodiments is applied to an electronic apparatus 3. Aspects of present disclosure

1. Embodiments

1-1. First Embodiment

1-1A. Configuration Example

Example of Entire Structure

Figure 1:
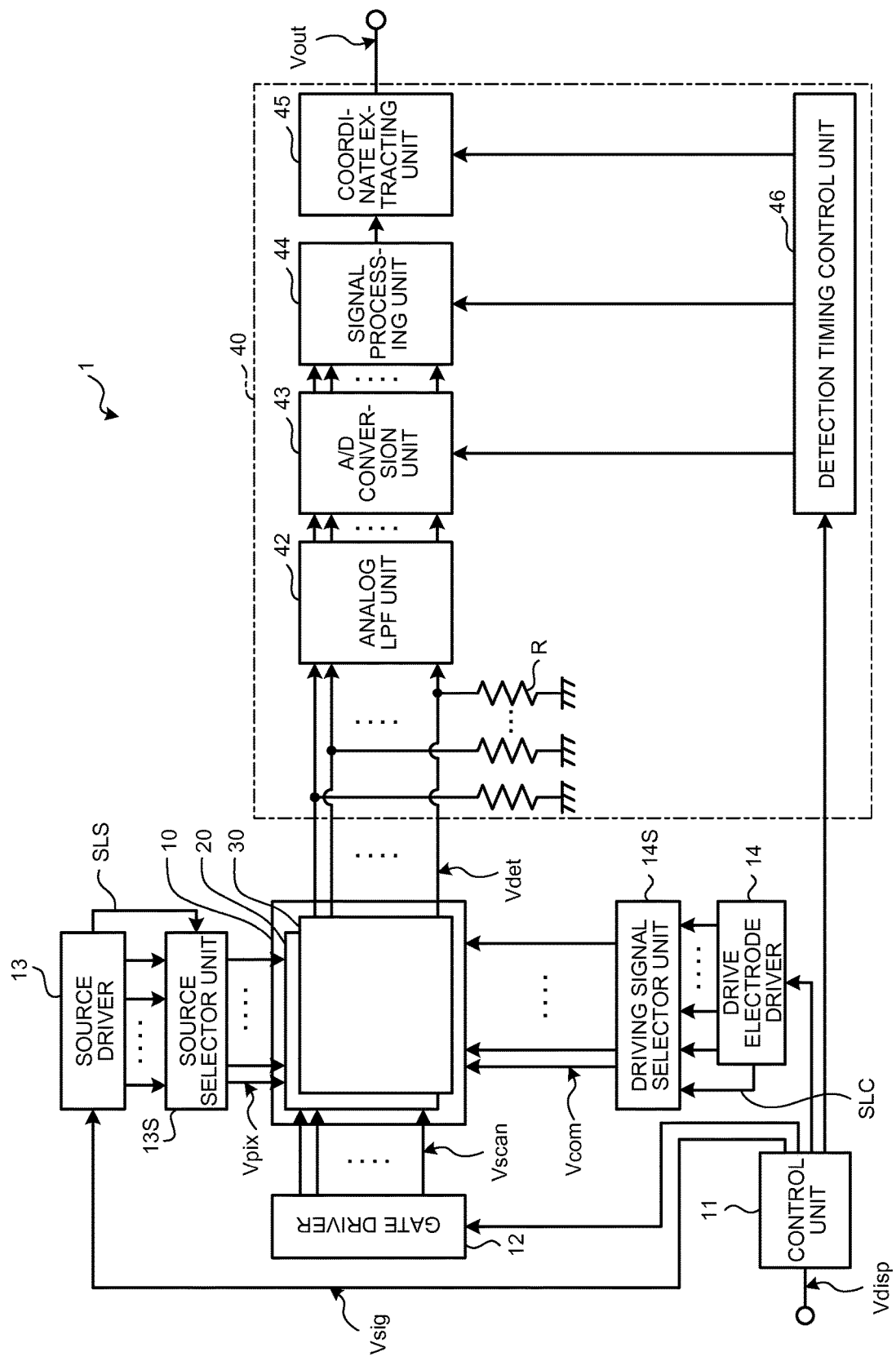
FIG. 1 is a block diagram illustrating a configuration example of a display device with a touch detection function according to a first embodiment.

FIG. 1 is a block diagram illustrating a configuration example of a display device with a touch detection function according to a first embodiment. A display device with a touch detection function 1 includes a display unit with a touch detection function 10, a control unit 11, a gate driver 12, a source driver 13, a source selector unit 13S, a drive electrode driver 14, a driving signal selector unit 14S, and a touch detection unit 40. The display device with a touch detection function 1 is a display device in which the display unit with a touch detection function 10 incorporates a touch detection function. The display unit with a touch detection function 10 is what is called an in-cell type device in which a liquid crystal display unit 20 using a liquid crystal display element as a display element and an electrostatic capacitance type touch detection device 30 are integrated with each other. Alternatively, the display unit with a touch detection function 10 may be what is called an on-cell type device in which the electrostatic capacitance type touch detection device 30 is mounted on the liquid crystal display unit 20 using the liquid crystal display element as the display element.

As described later, the liquid crystal display unit 20 is a device that performs display by performing sequential scanning for each horizontal line according to a scanning signal Vscan supplied from the gate driver 12. The control unit 11 is a circuit that supplies a control signal to each of the gate driver 12, the source driver 13, the drive electrode driver 14, and the touch detection unit 40 based on a video signal Vdisp supplied from the outside to control them to operate in synchronization with each other.

The gate driver 12 has a function for sequentially selecting one horizontal line to be a display driving target of the display unit with a touch detection function 10 based on the control signal supplied from the control unit 11.

The source driver 13 is a circuit that supplies a pixel signal Vpix to each pixel Pix (sub-pixel SPix) of the display unit with a touch detection function 10 to be described later, based on the control signal supplied from the control unit 11. As described later, the source driver 13 generates, from a video signal for one horizontal line, a pixel signal obtained by time division multiplexing the pixel signal Vpix of a plurality of sub-pixels SPix of the liquid crystal display unit 20, and supplies the generated pixel signal to the source selector unit 13S. The source driver 13 generates a switch control signal SLS required for separating the pixel signal Vpix multiplexed with an image signal Vsig, and supplies the generated signal to the source selector unit 13S along with the pixel signal Vpix. The source selector unit 13S performs multiplexer driving to supply the pixel signal Vpix to sequentially perform writing for each sub-pixel SPix corresponding to each color of a color filter to be described later. Due to the multiplexer driving, the source selector unit 13S may reduce the number of pieces of wiring between the source driver 13 and the control unit 11. Accordingly, although the source selector unit 13S requires time for sequentially performing writing for each of three sub-pixels SPix for each of color regions colored in three colors, that is, red (R), green (G), and blue (B), in the color filter 32, an area of a driver IC can be reduced.

The drive electrode driver 14 is a circuit that supplies a driving signal Vcom to a drive electrode COML (described later) of the display unit with a touch detection function 10 based on the control signal supplied from the control unit 11. The driving signal selector unit 14S selects the drive electrode COML (described later) supplying the driving signal Vcom according to a switch control signal SLC generated by the drive electrode driver 14.

Basic Principle of Electrostatic Capacitance Type Touch Detection

Figure 2:
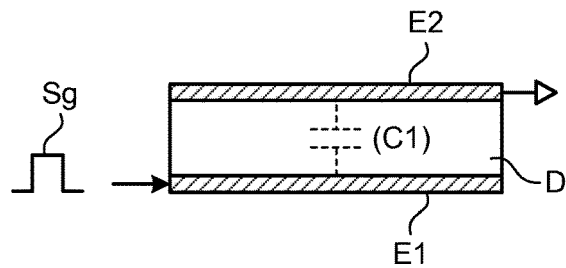
FIG. 2 is an explanatory diagram illustrating a state in which a finger does not make contact with or is not close to a device for explaining a basic principle of an electrostatic capacitance type touch detection mode.
Figure 3:
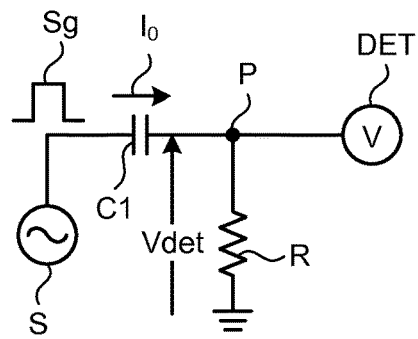
FIG. 3 is an explanatory diagram illustrating an example of an equivalent circuit in the state in which a finger does not make contact with or is not close to a device as illustrated in FIG. 2.
Figure 4:
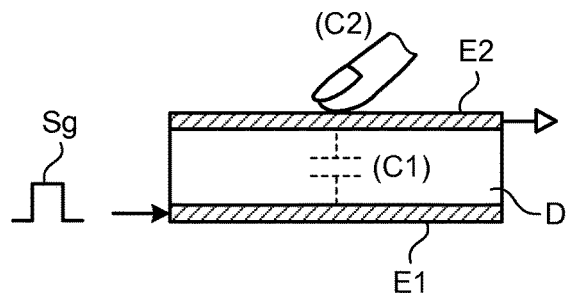
FIG. 4 is an explanatory diagram illustrating a state in which a finger makes contact with or is close to a device for explaining the basic principle of the electrostatic capacitance type touch detection mode.
Figure 5:
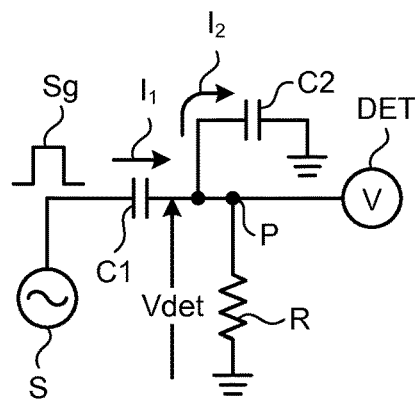
FIG. 5 is an explanatory diagram illustrating an example of an equivalent circuit in the state in which a finger makes contact with or is close to a device as illustrated in FIG. 4.
Figure 6:
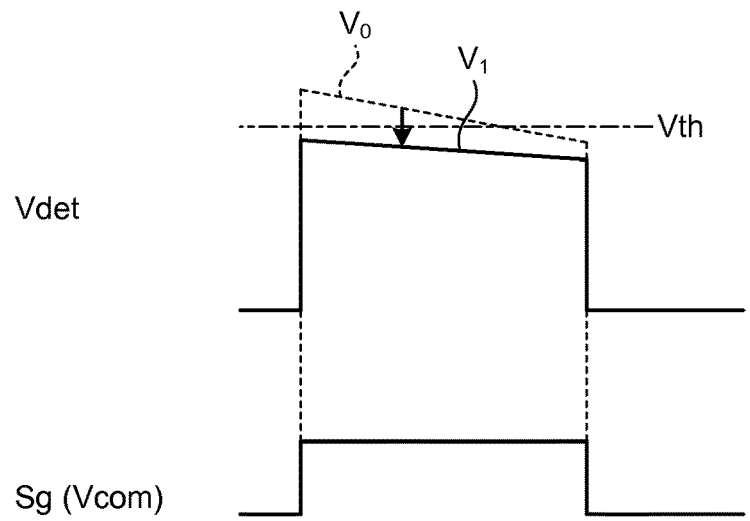
FIG. 6 illustrates an example of waveforms of a driving signal and a touch detection signal.

The touch detection device 30 operates based on a basic principle of the electrostatic capacitance type touch detection and outputs a touch detection signal Vdet. With reference to FIG. 1 to FIG. 6, the following describes the basic principle of the touch detection in the display device with a touch detection function 1 according to the embodiment. FIG. 2 is an explanatory diagram illustrating a state in which a finger does not make contact with or is not close to a device for explaining the basic principle of the electrostatic capacitance type touch detection mode. FIG. 3 is an explanatory diagram illustrating an example of an equivalent circuit in the state in which a finger does not make contact with or is not close to a device as illustrated in FIG. 2. FIG. 4 is an explanatory diagram illustrating a state in which a finger makes contact with or is close to a device for explaining the basic principle of the electrostatic capacitance type touch detection mode. FIG. 5 is an explanatory diagram illustrating an example of an equivalent circuit in the state in which a finger makes contact with or is close to a device as illustrated in FIG. 4.

For example, as illustrated in FIG. 2 and FIG. 4, a capacitive element C1 includes a pair of electrodes that are arranged being opposed to each other interposing a dielectric substance D, that is, a drive electrode E1 and a touch detection electrode E2. As illustrated in FIG. 3 and FIG. 5, one end of the capacitive element C1 is coupled to an alternating current (AC) signal source (driving signal source) S, and the other end P thereof is grounded via a resistor R and coupled to a voltage detector (touch detection unit) DET.

When an AC rectangular wave Sg of predetermined frequency (for example, about several kilohertz to several hundred kilohertz) is applied to the drive electrode E1 (one end of the capacitive element C1) from the AC signal source, an output waveform (touch detection signal Vdet) appears on the touch detection electrode E2 (the other end P of the capacitive element C1). The AC rectangular wave Sg corresponds to a touch driving signal Vcomt to be described later.

As illustrated in FIG. 2 and FIG. 3, in the state in which a finger does not make contact with (or is not close to) a device (non-contact state), an electric current $I_0$ corresponding to a capacitance value of the capacitive element C1 flows along with charge and discharge of the capacitive element C1. In this case, a potential waveform at the other end P of the capacitive element C1 is like a waveform $V_0$ illustrated in FIG. 6, for example. The voltage detector DET illustrated in FIG. 3 detects the waveform $V_0$.

As illustrated in FIG. 4, in the state in which a finger makes contact with (or is close to) a device (contact state), a capacitance caused by the finger acts as a capacitive element C2 to be added to the capacitive element C1. With reference to the equivalent circuit illustrated in FIG. 5, the capacitive element C2 is added to the capacitive element C1 in series. In this state, electric currents $I_1$ and $I_2$ flow in the capacitive elements C1 and C2 along with the charge and discharge of the capacitive elements C1 and C2. In this case, the potential waveform at the other end P of the capacitive element C1 is like a waveform $V_1$ in FIG. 6 for example, and the voltage detector DET detects the waveform $V_1$. In this case, a potential at the other end P is a divided voltage potential determined by a value of the electric currents $I_1$ and $I_2$ flowing through the capacitive elements C1 and C2. Accordingly, the waveform $V_1$ is smaller than the waveform $V_0$ in the non-contact state. The voltage detector DET compares the detected voltage with a predetermined threshold voltage Vth, and determines that it is in the non-contact state when the detected voltage is equal to or more than the threshold voltage while determining that it is in the contact state when the detected voltage is less than the threshold voltage Vth. As described above, the touch detection is enabled.

The touch detection device 30 illustrated in FIG. 1 supplies the driving signal Vcom supplied from the drive electrode driver 14 via the driving signal selector unit 14S to the drive electrode COML as the driving signal Vcomt for touch detection (hereinafter, referred to as a touch driving signal Vcomt), and performs sequential scanning for each detection block according to the touch driving signal Vcomt to perform the touch detection.

The touch detection device 30 outputs a touch detection signal Vdet for each detection block from a plurality of touch detection electrodes TDL to be described later, and supplies the output signal to the touch detection unit 40.

The touch detection unit 40 is a circuit that detects whether touching is performed on the touch detection device 30 (the contact state as described above) based on the control signal supplied from the control unit 11 and the touch detection signal Vdet supplied from the touch detection device 30 of the display unit with a touch detection function 10, and obtains coordinates and the like thereof in a touch detection region when the touching is performed. The touch detection unit 40 includes an analog low pass filter (LPF) unit 42, an A/D conversion unit 43, a signal processing unit 44, a coordinate extracting unit 45, and a detection timing control unit 46.

The analog LPF unit 42 is a low-pass analog filter that receives an input of the touch detection signal Vdet supplied from the touch detection device 30, removes high frequency components (noise components) included in the touch detection signal Vdet, and extract touch components to be output. The resistor R for applying a direct current (DC) potential (0 V) is coupled to between each of input terminals of the analog LPF unit 42 and a ground. Alternatively, for example, a switch may be provided instead of the resistor R, and the DC potential (0 V) may be applied by turning on the switch at predetermined time.

The A/D conversion unit 43 is a circuit that samples each analog signal output from the analog LPF unit 42 and converts it to a digital signal at a timing synchronized with the driving signal Vcom.

The signal processing unit 44 includes a digital filter that removes frequency components (noise components) higher than a frequency at which the touch driving signal Vcomt is sampled included in the output signal of the A/D conversion unit 43 to extract the touch component. The signal processing unit 44 is a logic circuit that detects whether touching is performed on the touch detection device 30 based on the output signal of the A/D conversion unit 43.

The coordinate extracting unit 45 is a logic circuit that obtains touch panel coordinates when the touch is detected by the signal processing unit 44. The detection timing control unit 46 controls the A/D conversion unit 43, the signal processing unit 44, and the coordinate extracting unit 45 to operate in synchronization with each other. The coordinate extracting unit 45 outputs the touch panel coordinates as a signal output Vout.

Module

Figure 7:
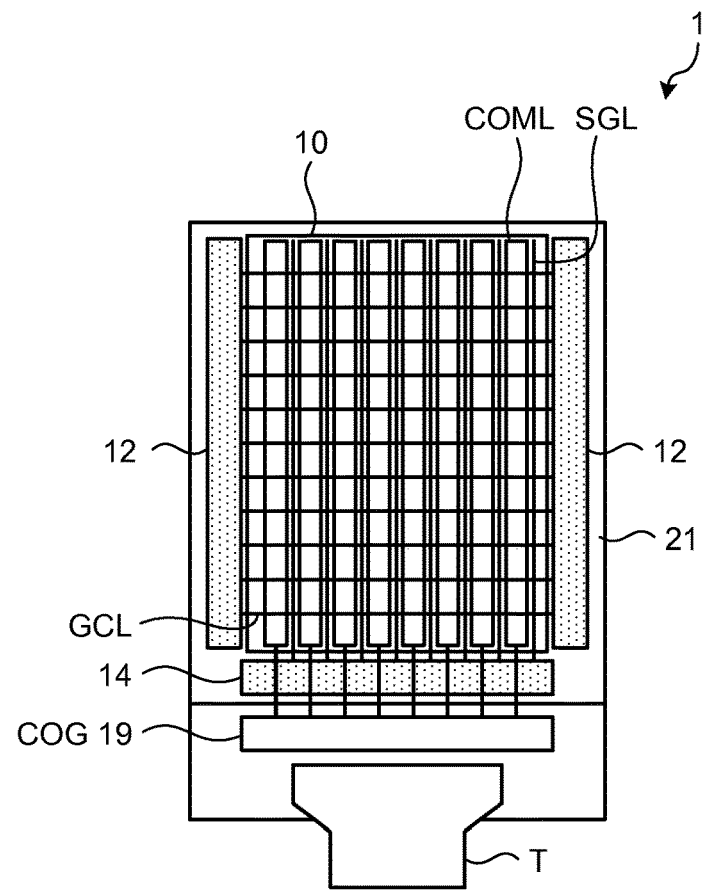
FIG. 7 illustrates an example of a module on which the display device with a touch detection function according to the first embodiment is mounted.

FIG. 7 illustrates an example of a module on which the display device with a touch detection function according to the first embodiment is mounted. As illustrated in FIG. 7, the display device with a touch detection function 1 includes the display unit with a touch detection function 10, the drive electrode driver 14, and a chip on glass (COG) 19. The COG 19 includes the source driver 13 and the source selector unit 13S described above. Although not illustrated, the driving signal selector unit 14S is arranged at the same position as the drive electrode driver 14. The drive electrode driver 14 is formed on a TFT substrate 21 as a glass substrate. The COG 19 is a chip mounted on the TFT substrate 21 and incorporates each circuit required for the display operation such as the control unit 11 and the source driver 13 illustrated in FIG. 1. In the display device with a touch detection function 1, the chip on glass (COG) may incorporate a circuit such as the drive electrode driver 14 and the gate driver 12.

In FIG. 7, in this display unit with a touch detection function 10 of the display device with a touch detection function 1, the drive electrode COML and a scanning signal line GCL that is coupled to the gate driver 12 and is formed to three-dimensionally cross the drive electrode COML are schematically illustrated in a direction orthogonal to a surface of the TFT substrate 21 (in a plan view). In FIG. 7, in this display unit with a touch detection function 10, the drive electrode COML and the pixel signal line SGL that is formed to extend in a direction parallel to the drive electrode COML without crossing are schematically illustrated in the direction orthogonal to the surface of the TFT substrate 21.

The drive electrode COML is formed in a direction along one side of the display unit with a touch detection function 10, and the touch detection electrode TDL to be described later is formed in a short side direction of the display unit with a touch detection function 10. An output terminal of the touch detection electrode TDL is coupled to the touch detection unit 40 (not illustrated) mounted to the outside of the module via a terminal part T that is provided on the short side of the display unit with a touch detection function 10 and is configured by a flexible substrate and the like.

As described above, the display device with a touch detection function 1 illustrated in FIG. 7 outputs the touch detection signal Vdet from the short side of the display unit with a touch detection function 10. Accordingly, in the display device with a touch detection function 1, routing of the wiring is facilitated in coupling to the touch detection unit 40 via the terminal part T.

Display Device with Touch Detection Function

Figure 8:
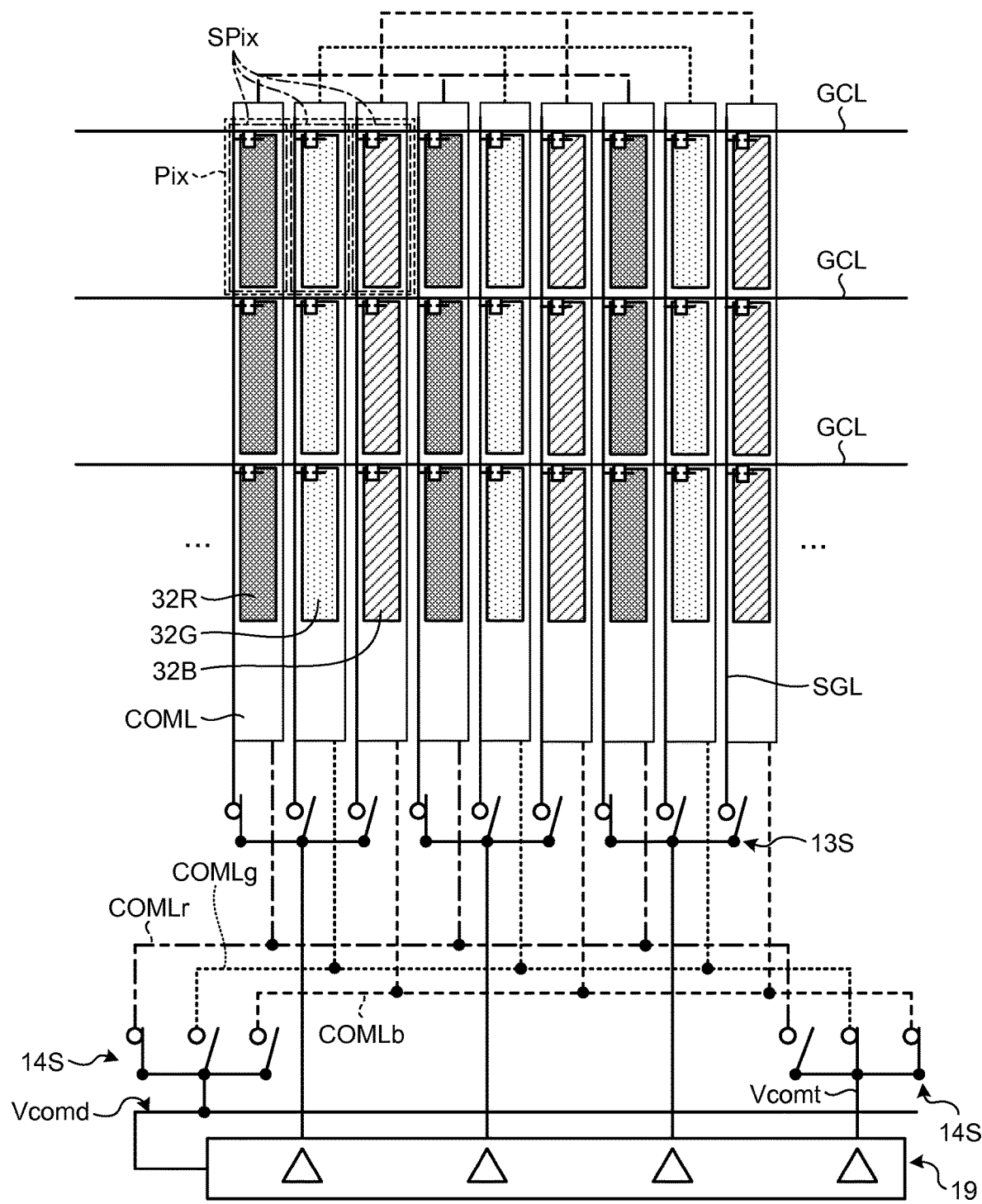
FIG. 8 is a schematic diagram for explaining a relation between the drive electrode and a pixel signal line in the module on which the display device with a touch detection function according to the first embodiment is mounted.
Figure 9:
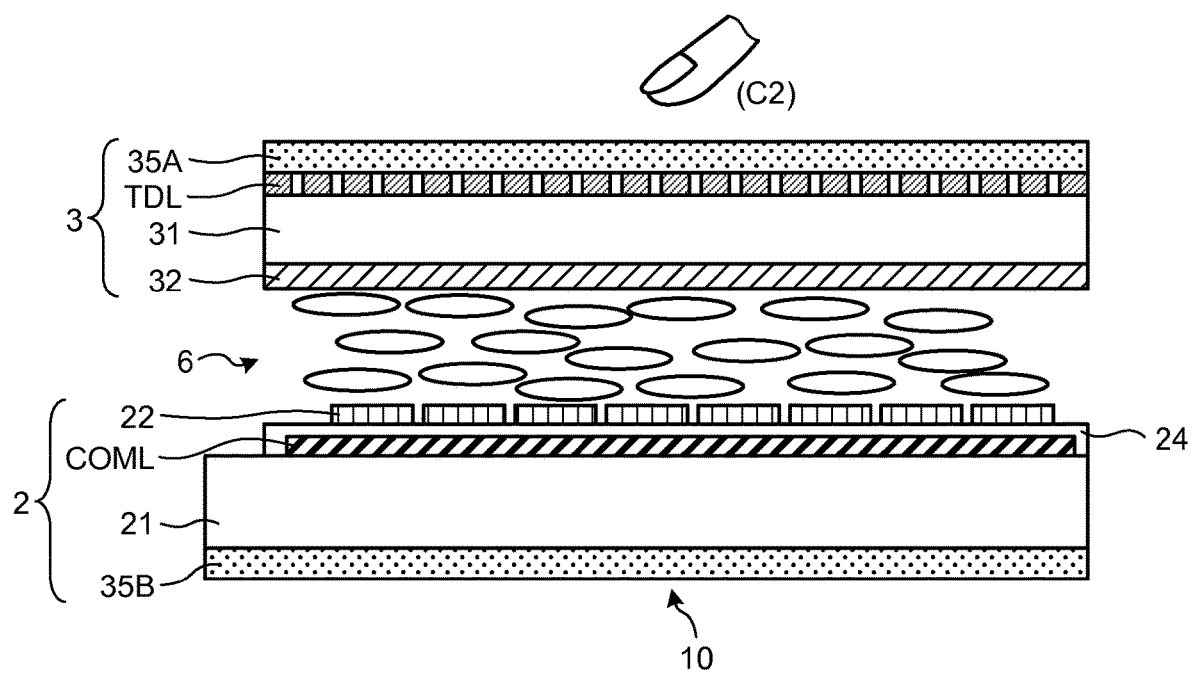
FIG. 9 is a sectional view illustrating a schematic sectional structure of a display unit with a touch detection function according to the first embodiment.
Figure 10:
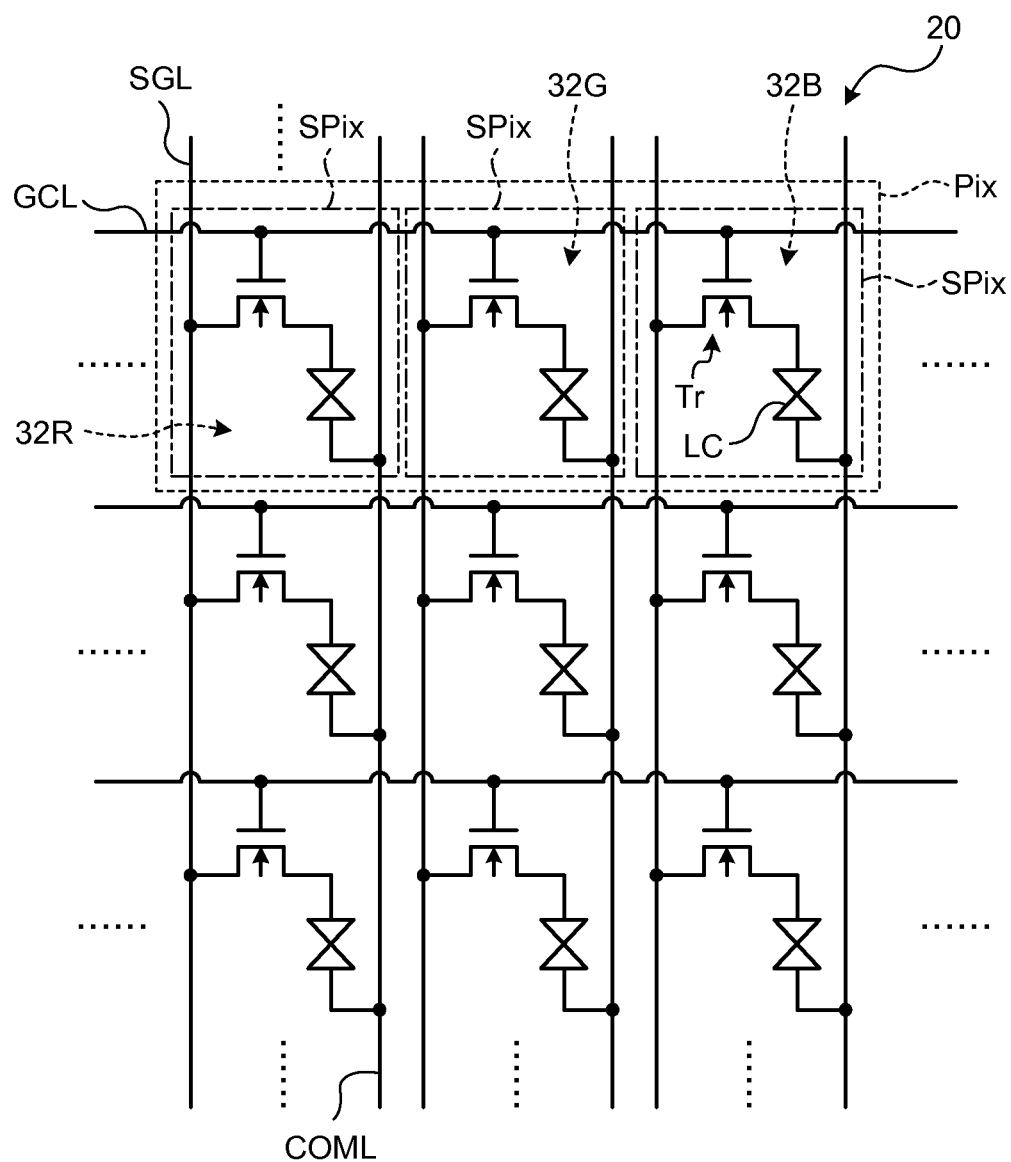
FIG. 10 is a circuit diagram illustrating a pixel array of the display unit with a touch detection function according to the first embodiment.

Next, the following describes a configuration example of the display unit with a touch detection function 10 described above in detail. FIG. 8 is a schematic diagram for explaining a relation between the drive electrode and a pixel signal line in the module on which the display device with a touch detection function according to the first embodiment is mounted. FIG. 9 is a sectional view illustrating a schematic sectional structure of the display device with a touch detection function according to the first embodiment. FIG. 10 is a circuit diagram illustrating a pixel array of the display device with a touch detection function according to the first embodiment.

As illustrated in FIG. 8, in the display device with a touch detection function 1, a pixel signal line SGL is coupled to the source driver 13 incorporated in the COG 19 via the source selector unit 13S. The source selector unit 13S performs opening/closing operation in response to the switch control signal SLS. In the display device with a touch detection function 1, the drive electrode COML is coupled to the drive electrode driver 14 incorporated in the COG 19. A color filter 32 includes color regions 32R, 32G, and 32B colored in different three colors, that is, red (R), green (G), and blue (B). The color filter 32 is opposed to the drive electrode COML in the direction orthogonal to the TFT substrate 21, and overlaps the drive electrode COML in the orthogonal direction to the surface of the TFT substrate 21.

Each of the drive electrodes COML extends in parallel for each of the color regions 32R, 32G, and 32B colored in the three colors, red (R), green (G), and blue (B) in the color filter 32. Each of the drive electrodes COML corresponding to each of the color regions 32R, 32G, and 32B colored in the three colors, red (R), green (G), and blue (B) in the color filter 32 is electrically coupled to corresponding one of drive electrode wiring COMLr, drive electrode wiring COMLg, and drive electrode wiring COMLb. Accordingly, the drive electrode COML can lower electric resistance. Accordingly, a width of the drive electrode COML orthogonal to an extending direction thereof can be reduced. Therefore, in the display unit with a touch detection function 10, the definition of the liquid crystal display unit 20 can be increased.

As illustrated in FIG. 9, the display unit with a touch detection function 10 includes a pixel substrate 2, a counter substrate 3 arranged to be opposed to the direction orthogonal to the surface of the pixel substrate 2, and a liquid crystal layer 6 interposed between the pixel substrate 2 and the counter substrate 3.

The liquid crystal layer 6 modulates light passing therethrough corresponding to the state of an electric field. For example, as the liquid crystal layer 6, used are liquid crystals in various modes such as a twisted nematic (TN) mode, a vertical alignment (VA) mode, and an electrically controlled birefringence (ECB) mode. An orientation film may be arranged between the liquid crystal layer 6 and the pixel substrate 2, and between the liquid crystal layer 6 and the counter substrate 3, illustrated in FIG. 9.

The counter substrate 3 includes a glass substrate 31 and the color filter 32 formed on one surface of the glass substrate 31. The touch detection electrode TDL that is a detection electrode of the touch detection device 30 is formed above the other surface of the glass substrate 31, and a polarizing plate 35A is arranged above the touch detection electrode TDL.

The pixel substrate 2 includes the TFT substrate 21 as a circuit board, a plurality of pixel electrodes 22 arranged in a matrix above the TFT substrate 21, the drive electrodes COML formed between the TFT substrate 21 and the pixel electrode 22, and an insulating layer 24 that insulates between the pixel electrodes 22 and the drive electrodes COML, and an incident side polarizing plate 35B arranged above an under surface side of the TFT substrate 21.

The TFT substrate 21 includes wiring formed thereon including a thin film transistor (TFT) element Tr of each sub-pixel SPix, the pixel signal line SGL that supplies the pixel signal Vpix to each of the pixel electrodes 22, and the scanning signal line GCL that drives each TFT element Tr as illustrated in FIG. 10. As described above, the pixel signal line SGL extends along a plane in parallel to the surface of the TFT substrate 21, and supplies the pixel signal Vpix for displaying an image to a pixel. The pixel signal line SGL is in a floating state, not coupled to a GND. The liquid crystal display unit 20 illustrated in FIG. 10 includes the sub-pixels SPix arranged in a matrix. The sub-pixel SPix includes the TFT element Tr and a liquid crystal element LC. The TFT element Tr includes a thin film transistor. In this example, the TFT element Tr includes an n-channel MOS (metal oxide semiconductor) type TFT. A source of the TFT element Tr is coupled to the pixel signal line SGL, a gate thereof is coupled to the scanning signal line GCL, and a drain thereof is coupled to an end of the liquid crystal element LC. The liquid crystal element LC is coupled to the drain of the TFT element Tr at one end thereof, and is coupled to the drive electrode COML at the other end thereof.

The sub-pixel SPix is coupled to the other sub-pixels SPix belonging to the same row in the liquid crystal display unit 20 via the scanning signal line GCL. The scanning signal line GCL is coupled to the gate driver 12, and the scanning signal Vscan is supplied from the gate driver 12. The sub-pixel SPix is coupled to the other sub-pixels SPix belonging to the same column in the liquid crystal display unit 20 via the pixel signal line SGL. The pixel signal line SGL is coupled to the source driver 13, and the image signal Vpix is supplied from the source driver 13. The sub-pixel SPix is also coupled to the other sub-pixels SPix belonging to the same column in the liquid crystal display unit 20 via the drive electrode COML. The drive electrode COML is coupled to the drive electrode driver 14, and the driving signal Vcom is supplied from the drive electrode driver 14. That is, in this example, the sub-pixels SPix belonging to the same column share one drive electrode COML.

The gate driver 12 illustrated in FIG. 1 applies the scanning signal Vscan to the gate of the TFT element Tr of the sub-pixel SPix via the scanning signal line GCL illustrated in FIG. 10 to sequentially select, as a display driving target, a row (one horizontal line) of the sub-pixels SPix formed in a matrix in the liquid crystal display unit 20. The source driver 13 illustrated in FIG. 1 supplies, via the pixel signal line SGL illustrated in FIG. 10, the pixel signal Vpix to each sub-pixel SPix configuring one horizontal line that is sequentially selected by the gate driver 12. These sub-pixels SPix perform display of one horizontal line corresponding to the supplied pixel signal Vpix. The drive electrode driver 14 illustrated in FIG. 1 applies the driving signal Vcom and drives the drive electrode COML for each drive electrode block including a predetermined number of drive electrodes COML illustrated in FIG. 9 and FIG. 10.

As described above, in the liquid crystal display unit 20, the gate driver 12 drives the scanning signal line GCL so as to perform line-sequential scanning in a time division manner, so that one horizontal line is sequentially selected. In the liquid crystal display unit 20, the source driver 13 supplies the pixel signal Vpix to the sub-pixel SPix belonging to one horizontal line, so that display for each horizontal line is performed. When performing the display operation, the drive electrode driver 14 applies the driving signal Vcomd for display to the drive electrode block including the drive electrode COML corresponding to the horizontal line. As described above, the drive electrode COML functions as a common drive electrode (common electrode) of the liquid crystal display unit 20, and also functions as a drive electrode of the touch detection device 30. Hereinbelow, the driving signal Vcom as a display driving signal will be described as a display driving signal Vcomd, and the driving signal Vcom as a touch driving signal will be described as a touch driving signal Vcomt.

In the color filter 32 illustrated in FIG. 9, for example, color regions of the color filters colored in three colors such as red (R), green (G), and blue (B) are periodically arranged, and a set of color regions 32R, 32G, and 32B of the three colors (R, G, and B) (refer to FIG. 8) is associated with the sub-pixels SPix illustrated in FIG. 10 as the pixel Pix. As described above, the sub-pixel Spix can perform monochrome display. The color filter 32 is opposed to the liquid crystal layer 6 in a direction orthogonal to the TFT substrate 21. The color filter 32 may have another color combination as long as it is colored in different colors from each other. The color filter 32 may not be provided. As described above, a region where there is no color filter, that is, a transparent sub-pixel may be provided.

Figure 11:
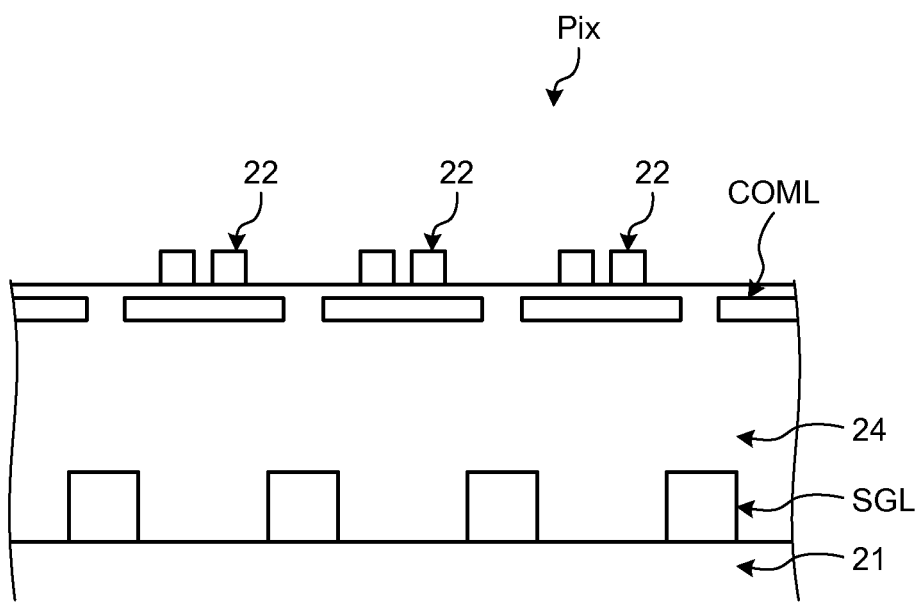
FIG. 11 is a schematic sectional view for explaining a relation among the drive electrode, the pixel signal line, and a pixel electrode in the module on which the display device with a touch detection function according to the first embodiment is mounted.
Figure 12:
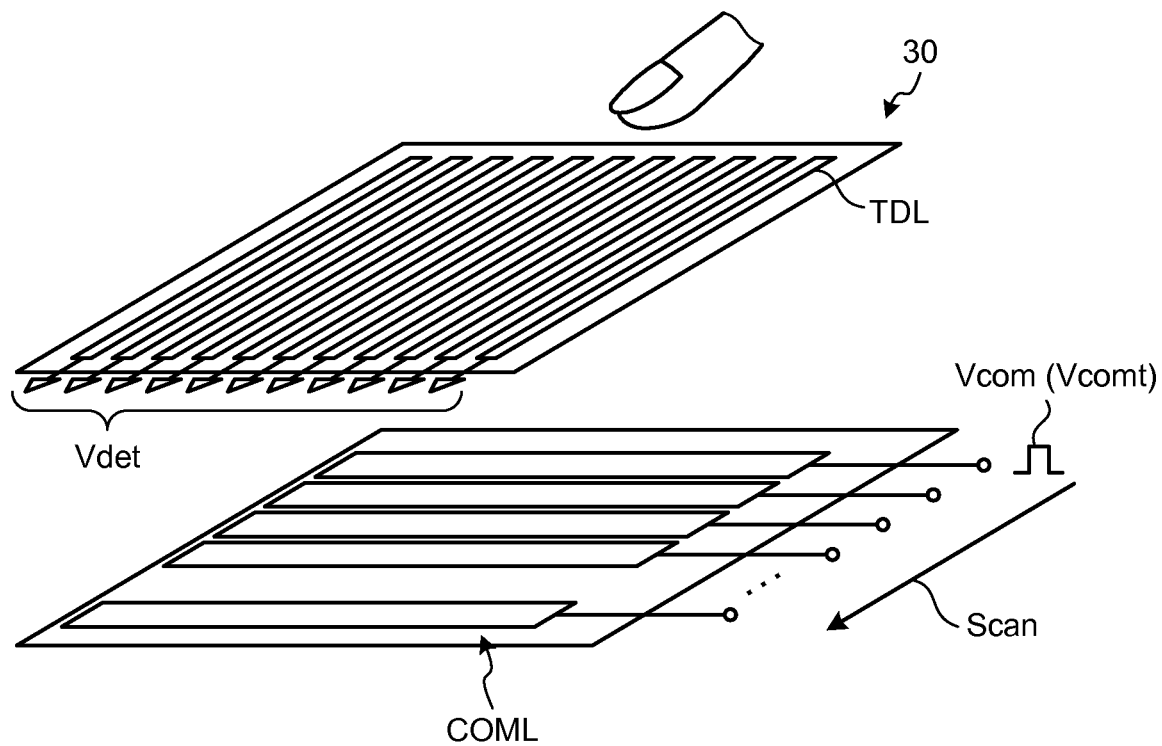
FIG. 12 is a perspective view illustrating a configuration example of the drive electrode and the touch detection electrode in the display unit with a touch detection function according to the first embodiment.

The drive electrode COML according to the embodiment functions as a drive electrode of the liquid crystal display unit 20, and also functions as a drive electrode of the touch detection device 30. FIG. 11 is a schematic sectional view for explaining a relation among the drive electrode, the pixel signal line, and the pixel electrode in the module on which the display device with a touch detection function according to the first embodiment is mounted. FIG. 12 is a perspective view illustrating a configuration example of the drive electrode and the touch detection electrode in the display device with a touch detection function according to the first embodiment. As illustrated in FIG. 11, the drive electrode COML is opposed to the pixel electrode 22 in the direction orthogonal to the surface of the TFT substrate 21. As illustrated in FIG. 11 and FIG. 8, arrangement is such that one drive electrode COML corresponds to one pixel electrode 22 (pixel electrode 22 constituting one column). The insulating layer 24 insulates between the pixel electrode 22 and the drive electrode COML, and also insulates between the pixel electrode 22 and the pixel signal line SGL formed above the surface of the TFT substrate 21.

As illustrated in FIG. 8, the drive electrode COML extends in a direction parallel to the direction along which the pixel signal line SGL extends. The drive electrodes COML may extend in a direction different from the direction along which the pixel signal line SGL extends as long as the drive electrodes COML are formed having a width including one or more pixels (sub-pixels) in a plan view in a direction orthogonal to the direction along which the pixel signal line SGL extends, that is, a direction along which the scanning signal line GCL extends. It is preferable that the drive electrode COML extend in the direction parallel to the direction along which the pixel signal line SGL extends, which will facilitate patterning of the drive electrode COML. The driving signal Vcom having the AC rectangular waveform is applied to the drive electrode COML from the drive electrode driver 14 via a contact conductive pole having electrical conductivity (not illustrated). The touch driving signal Vcomt preferably has the AC rectangular waveform, and the driving signal Vcomd for display may have either the AC rectangular waveform or a DC voltage. In the pixel Pix, the color regions 32R, 32G, and 32B of the three colors (R, G, and B) are assigned to the sub-pixels SPix illustrated in FIG. 10. As illustrated in FIG. 8, a gap between the adjacent drive electrodes COML is positioned between the adjacent pixels Pix. As described above, the drive electrodes COML extend in parallel to each other for each pixel Pix as a set of the color region 32R of red (R), the color region 32G of green (G), and the color region 32B of blue (B) of the color filter 32. Accordingly, the gap between the adjacent drive electrodes COML is periodically arranged by a pixel Pix unit, which makes it possible to reduce possibility that a streak accompanying the gap between the adjacent drive electrodes COML is visually recognized.

Generally, in the color filter 32, brightness of the color region 32G of green (G) is higher than brightness of the color region 32R of red (R) and the color region 32B of blue (B). The drive electrode COML is a transparent electrode formed by transparent conductive material (transparent conductive oxide) such as indium tin oxide (ITO). Although the drive electrode COML is transparent, the gap between the adjacent drive electrodes COML is easily recognized as a streak with human eyes. Accordingly, in the display device with a touch detection function 1 according to the first embodiment, the gap between the adjacent drive electrodes COML is positioned between the color region 32R of red (R) and the color region 32B of blue (B) that have relatively low brightness. Accordingly, the gap between the adjacent drive electrodes COML is periodically arranged by a pixel Pix unit, which makes it possible to reduce the possibility that the streak accompanying the gap between the adjacent drive electrodes COML is visually recognized. In the display device with a touch detection function 1 according to the first embodiment, an aperture ratio of the color region 32G of green (G) is maintained, the brightness of the color region 32G being higher than those of the color region 32R of red (R) and the color region 32B of blue (B).

Figure 13:
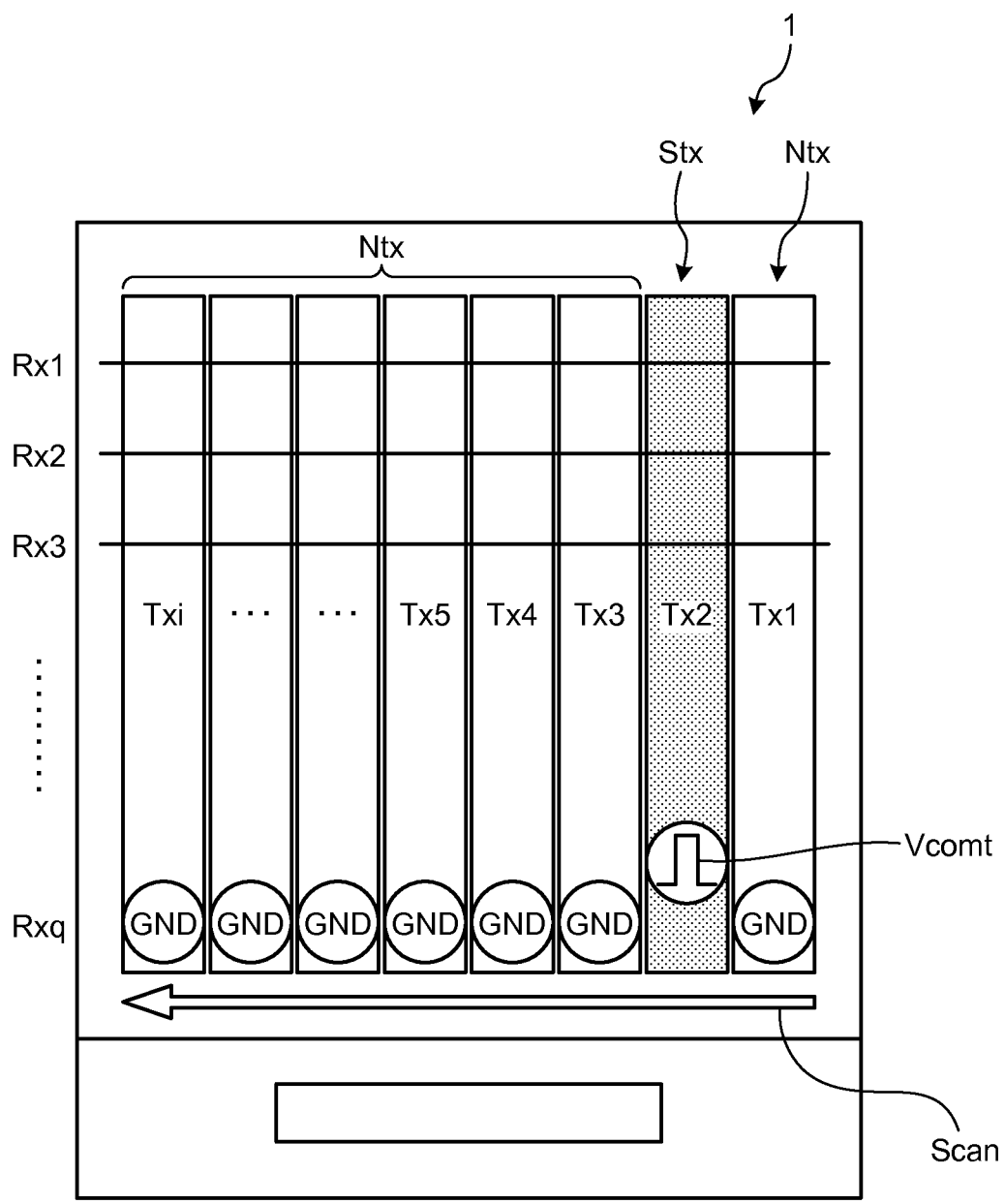
FIG. 13 is a schematic diagram illustrating an operation example of a drive electrode driver according to the first embodiment.

FIG. 12 is a perspective view illustrating a configuration example of the touch detection device 30. FIG. 13 is a schematic diagram illustrating an operation example of the drive electrode driver according to the first embodiment. The touch detection device 30 includes the drive electrode COML and the touch detection electrode TDL. The drive electrodes COML formed in a plurality of stripe electrode patterns extending in one direction separated from each other. The shape of the drive electrodes COML (drive electrode block) is not limited to a shape of a plurality of stripe pieces separated from each other. For example, the shape of the drive electrodes COML (drive electrode block) may be a comb-teeth shape. Alternatively, it is sufficient that the shape of the drive electrodes COML (drive electrode block) is the shape a plurality of pieces separated from each other, therefore, a shape of a slit that separates the drive electrodes COML may be either a straight line or a curved line. The drive electrodes COML may have the same length as the width of the sub-pixel Spix, which is displayed by the pixel electrode corresponding to a selection signal line, orthogonal to the direction along which the pixel signal line SGL extends. When a touch detection operation is performed, the driving signals Vcom are sequentially supplied to each of the electrode patterns by the drive electrode driver 14, and a line-sequential scanning drive is performed in a time division manner as described later. The touch detection electrodes TDL are composed of the stripe electrode patterns extending in a direction crossing the extending direction of the electrode patterns of the drive electrodes COML. The touch detection electrodes TDL are opposed to the drive electrodes COML in a direction orthogonal to the surface of the TFT substrate 21. Each of electrode pattern of the touch detection electrodes TDL is coupled to an input of the analog LPF unit 42 in the touch detection unit 40. The electrode patterns crossing each other by the drive electrodes COML and the touch detection electrodes TDL form capacitance at crossing portions therebetween.

With the above configuration, in the touch detection device 30, the drive electrode driver 14 drives the drive electrodes COML so as to perform line-sequential scanning of drive electrode blocks in a time division manner when performing the touch detection operation. For example, the drive electrode driver 14 supplies the driving signal Vcom to a selected drive electrode block Stx, and does not supply the driving signal Vcom to a drive electrode block Ntx that is not selected. Accordingly, as illustrated in FIG. 12, each one of the detection blocks of the drive electrodes COML is sequentially selected in a scanning direction Scan, and the touch detection device 30 outputs the touch detection signal Vdet from the touch detection electrodes TDL. For example, the drive electrodes COML described above are arranged so that scanning can be performed in a direction different from the direction along which the pixel signal line SGL extends. Accordingly, the drive electrode blocks are also arranged so that scanning can be performed in a direction different from the direction along which the pixel signal line SGL extends. The scanning direction Scan is different from the direction along which the pixel signal line SGL extends. In this way, the touch detection device 30 performs the touch detection for one detection block. In the touch detection device 30, each of drive electrode blocks Tx1 to Txi illustrated in FIG. 13 corresponds to the drive electrode E1 in the basic principle of the touch detection described above. In the touch detection device 30, each of detection blocks Rx1 to Rxq of the touch detection electrode TDL corresponds to the touch detection electrode E2. The touch detection device 30 detects touch according to the basic principle described above. As illustrated in FIG. 12, an electrostatic capacitance type touch sensor is configured in a matrix by the electrode patterns that are three-dimensionally crossing each other. Accordingly, by scanning across the entire touch detection surface of the touch detection device 30, it is possible to detect a position at which an external proximity object makes contact with or is close to the device.

The TFT substrate 21 corresponds to a specific example of a "substrate" in the present disclosure. The pixel electrode 22 corresponds to a specific example of a "pixel electrode" in the present disclosure. The pixel signal line SGL corresponds to a specific example of a "signal line" in the present disclosure. The drive electrode COML corresponds to a specific example of a "drive electrode" in the present disclosure. The liquid crystal element LC corresponds to a specific example of a "display function layer" in the present disclosure. The gate driver 12 corresponds to a specific example of a "gate driver" in the present disclosure. The source driver 13 corresponds to a specific example of a "source driver" in the present disclosure. The source selector unit 13S corresponds to a specific example of a "source selector unit" in the present disclosure. The drive electrode driver 14 corresponds to a specific example of a "drive electrode driver" in the present disclosure. The touch detection electrode TDL corresponds to a "touch detection electrode" in the present disclosure. The color filter 32 corresponds to a "color filter" in the present disclosure.

1-1B. Operation and Effects

Figure 14:
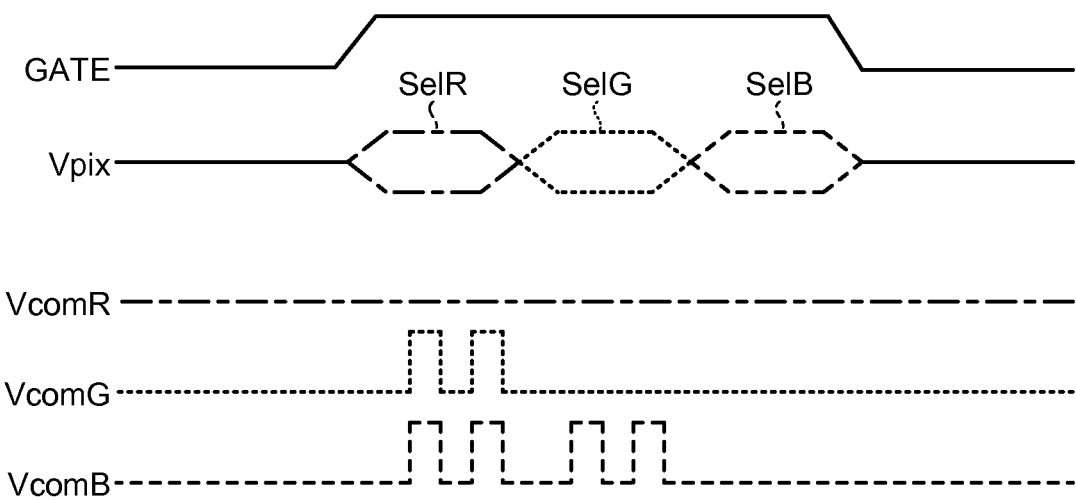
FIG. 14 is a schematic diagram illustrating a relation between a display operation period and a touch detection operation period according to the first embodiment.

Subsequently, the following describes an operation and effects of the display device with a touch detection function 1 according to the first embodiment. FIG. 14 is a schematic diagram illustrating a relation between a display operation period and a touch detection operation period according to the first embodiment.

The drive electrode COML functions as a drive electrode of the liquid crystal display unit 20 and also functions as a drive electrode of the touch detection device 30, so that the driving signals Vcom may affect each function. Accordingly, a gate-on signal is transmitted from the gate driver 12, and the pixel electrodes 22 (sub-pixels SPix) are selected via the pixel signal line SGL. The driving signal Vcom for touch detection is applied to the drive electrode COML opposed to the pixel electrode 22 (sub-pixel SPix) corresponding to a non-selection signal line in which an application of a pixel signal Vpix to the pixel signal line SGL is not selected by the source selector unit 13S, among the pixel electrodes 22 (sub-pixels SPix) selected by a scanning signal by the gate driver. The drive electrode driver 14 applies driving signals VcomR, VcomG, and VcomB for touch detection to the respective drive electrodes COML that correspond to each of the sub-pixels SPix corresponding to the color regions 32R, 32G, and 32B colored in the three colors, red (R), green (G), and blue (B) in the color filter 32. The drive electrode driver 14 applies the driving signal Vcomd for display to the drive electrode COML opposed to the pixel electrode 22 (sub-pixel SPix) corresponding to the selection signal line in which the application of the pixel signal Vpix to the pixel signal line SGL is selected by the source selector unit 13S. For example, as illustrated in FIG. 14, the source selector unit 13S sequentially performs writing in the order of source signals SelR, SelG, and SelB as the pixel signal Vpix for each of the three sub-pixels SPix in each color region colored in the three colors, red (R), green (G), or blue (B) in the color filter 32. Hereinafter, the driving signal Vcom as the driving signal for display applied by the drive electrode driver 14 in synchronization with the source signals SelR, SelG, and SelB is described as the display driving signal Vcomd, and the driving signal Vcom as the driving signal for touch detection is described as the touch driving signals VcomR, VcomG, and VcomB.

Outline of Entire Operation

The control unit 11 supplies a control signal to each of the gate driver 12, the source driver 13, the drive electrode driver 14, and the touch detection unit 40 based on the video signal Vdisp supplied from the outside to control these components operate in synchronization with each other. In a period (display operation period) GATE illustrated in FIG. 14, the gate driver 12 supplies the scanning signal Vscan to the liquid crystal display unit 20 and sequentially selects one horizontal line to be a display driving target. The source driver 13 supplies the source signals SelR, SelG, and SelB of the pixel signal Vpix to each of the sub-pixels SPix constituting the horizontal line selected by the gate driver 12.

The drive electrode driver 14 applies the driving signal Vcomd for display to the drive electrode COML opposed to each of the pixel electrodes 22 (sub-pixels SPix) in a direction orthogonal thereto, the pixel electrodes 22 (Sub-pixels Spix) being supplied with the source signals SelR, SelG, and SelB as a pixel signal Vpix illustrated in FIG. 14. The drive electrode driver 14 applies the touch driving signal Vcomt to the drive electrode COML opposed to the pixel electrode 22 (sub-pixel SPix) corresponding to the non-selection signal line in which the application of the pixel signal Vpix to the pixel signal line SGL is not selected by the source selector unit 13S, among the pixel electrodes 22 (sub-pixels SPix) to which the scanning signal is applied from the gate driver 12. The drive electrode driver 14 sequentially applies the touch driving signal Vcomt of which frequency is higher than that of the driving signal Vcomd for display to a drive electrode block according to the touch detection operation, and sequentially selects each detection block. In FIG. 13, drive electrode block Tx2 is illustrated as the drive electrode COML that is applied with the touch driving signal Vcomt.

The display unit with a touch detection function 10 performs display operation based on the signals supplied from the gate driver 12, the source driver 13, and the drive electrode driver 14. The display unit with a touch detection function 10 performs touch detection operation based on the touch driving signal Vcomt supplied from the drive electrode driver 14, and outputs the touch detection signal Vdet from the touch detection electrode TDL. The analog LPF unit 42 amplifies and outputs the touch detection signal Vdet. The A/D conversion unit 43 converts an analog signal output from the analog LPF unit 42 into a digital signal at a timing synchronized with the touch driving signal Vcomt. The signal processing unit 44 detects whether touching is performed on the touch detection device 30 based on the output signal of the A/D conversion unit 43. The coordinate extracting unit 45 obtains touch panel coordinates when the touch is detected by the signal processing unit 44, and outputs the touch panel coordinates as the signal output Vout.

Detailed Operation

Next, the following describes a detailed operation of the display device with a touch detection function 1. The liquid crystal display unit 20 performs display by sequentially scanning the horizontal lines of the adjacent scanning signal lines GCL one by one among the scanning signal lines GCL according to the scanning signal Vscan supplied from the gate driver 12. Similarly, based on the control signal supplied from the control unit 11, the drive electrode driver 14 supplies the signals to the Tx2-th drive electrode block, the Tx3-th drive electrode block, . . . , and the Txi-th drive electrode block that are adjacent to each other and illustrated in FIG. 13, among the drive electrodes COML of the display unit with a touch detection function 10.

As illustrated FIG. 14, the display device with a touch detection function 1 applies the driving signal Vcomd for display to the drive electrode COML when the application of the pixel signal Vpix to the pixel signal line SGL corresponding to the drive electrode COML is selected by the source selector unit 13S in the period GATE in which the pixel electrodes are selected by one scanning signal by the gate driver. The display device with a touch detection function 1 applies the driving signals VcomG and VcomB as the touch driving signal Vcomt to the drive electrodes COML when the application of the pixel signal Vpix to the pixel signal lines SGL corresponding to the drive electrodes COML is not selected by the source selector unit 13S in the period GATE in which the gate driver 12 that applies the scanning signal to the pixel electrodes is operating.

For example, when the application of the source signal SelR as the pixel signal Vpix to the pixel signal line SGL is selected by the source selector unit 13S illustrated in FIG. 8, the driving signal selector unit 14S applies the driving signal Vcomd for display to the drive electrode wiring COMLr and applies the driving signal VcomG and the driving signal VcomB illustrated in FIG. 14 as the touch driving signal Vcomt to the drive electrode wiring COMLg and COMLb. When the application of the source signal SelG as the pixel signal Vpix to the pixel signal line SGL is selected by the source selector unit 13S illustrated in FIG. 8, the driving signal selector unit 14S applies the driving signal Vcomd for display to the drive electrode wiring COMLg and applies the driving signal VcomB illustrated in FIG. 14 as the touch driving signal Vcomt to the drive electrode wiring COMLb. When the application of the source signal SelB as the pixel signal Vpix to the pixel signal line SGL is selected by the source selector unit 13S illustrated in FIG. 8, the driving signal selector unit 14S applies the driving signal Vcomd for display to the drive electrode wiring COMLb and does not apply the touch driving signal Vcomt to the drive electrode wiring COMLr and COMLg. Accordingly, in the display device with a touch detection function 1, the drive electrode COML to which the touch driving signal Vcomt is applied is scanned, a change in capacitance formed by a finger at a three-dimensionally crossing portion is detected with the scanned drive electrode COML, and the touch detection signal Vdet can be output corresponding to the external proximity object.

A range in which the capacitance caused by a finger at the three-dimensionally crossing portion is formed is larger than the pixel Pix or the sub-pixel SPix. Accordingly, the display device with a touch detection function 1 does not need to apply the touch driving signal Vcomt to all of the drive electrodes COML. As described above, the drive electrodes COML corresponding to each of the color regions 32R, 32G, and 32B colored in the three colors, red (R), green (G), and blue (B) in the color filter 32 are electrically coupled to the drive electrode wiring COMLr, the drive electrode wiring COMLg, and the drive electrode wiring COMLb, respectively. Each of the drive electrodes COML is one of the drive electrode blocks Tx1 to Txi illustrated in FIG. 13 as a combination electrically coupled to each other via the drive electrode wiring COMLr, the drive electrode wiring COMLg, and the drive electrode wiring COMLb. The driving signal selector unit 14S electrically couples the drive electrode COML to which the touch driving signal Vcomt is applied and the sub-pixel Spix that performs color display similar to the sub-pixel Spix opposed to the drive electrode. With this structure, when the touch driving signal Vcomt is applied to the drive electrode COML opposed to the pixel electrode 22 (sub-pixel SPix) corresponding to the non-selection signal line in which the application of the pixel signal Vpix to the pixel signal line SGL is not selected by the source selector unit 13S, the driving signal selector unit 14S can electrically couple the drive electrode COML opposed to the pixel electrode to which the scanning signal is not applied from the gate driver 12 and the drive electrode to which the touch driving signal Vcomt is applied. Accordingly, the display device with a touch detection function 1 according to the first embodiment may apply the touch driving signal Vcomt to the drive electrode COML having a low resistance. As a result, the display device with a touch detection function 1 according to the first embodiment can suppress the power consumption.

As illustrated in FIG. 14, when the application of the source signal SelR is selected, the drive electrode driver 14 does not apply the driving signal VcomR but applies the driving signals VcomG and VcomB as the touch driving signal Vcomt to the drive electrode COML. In the period GATE in which the pixel electrodes are selected by one scanning signal by the gate driver, after the source signal SelR is applied to the selection signal line (pixel signal line SGL) selected by the source selector unit, the driving signal VcomR for touch detection is not applied to the drive electrode COML opposed to the pixel electrode corresponding to the selected selection signal line (pixel signal line SGL). The drive electrode driver 14 applies the driving signal VcomG for touch detection before the driving signal Vcomd for display applied to the drive electrode COML in synchronization with the supply of the source signal SelG. The drive electrode driver 14 applies the driving signal VcomB for touch detection before the driving signal Vcomd for display applied to the drive electrode COML in synchronization with the supply of the source signal SelB. Accordingly, the display device with a touch detection function 1 can cancel influence occurred in the liquid crystal layer 6 due to the application of the driving signals VcomG and VcomB, by using the driving signal Vcomd for display. Accordingly, the display device with a touch detection function 1 can enhance display quality of the liquid crystal display unit 20.

As illustrated in FIG. 13 and FIG. 14, in the touch detection operation, different drive electrodes COML of the drive electrode blocks Tx1 to Txi are selected and applied with a rectangular wave of the touch driving signal Vcomt to perform scanning of the touch detection.

For example, as illustrated in FIG. 13, the drive electrode block Tx2 among the drive electrode blocks Tx1 to Txi is selected as a drive electrode block Stx, and the rectangular wave of the driving signal VcomG for touching illustrated in FIG. 14 is supplied thereto. The drive electrode block Tx1 and the drive electrode blocks Tx3 to Txi are drive electrode blocks Ntx that are not selected, and a potential of the drive electrodes COML in the non-selected drive electrode blocks Ntx is fixed to GND. The potential of the drive electrode COML as the drive electrode block Stx and the pixel signal line SGL opposed to the substrate in a direction orthogonal thereto is also fixed to the GND.

As illustrated in FIG. 13, this operation will be sequentially repeated from the drive electrode block Tx1 to the drive electrode block Txi. Accordingly, the display device with a touch detection function 1 performs display operation by scanning the entire display surface and performs touch detection operation by scanning the entire touch detection surface.

1-1C. First Modification of First Embodiment

Figure 15:
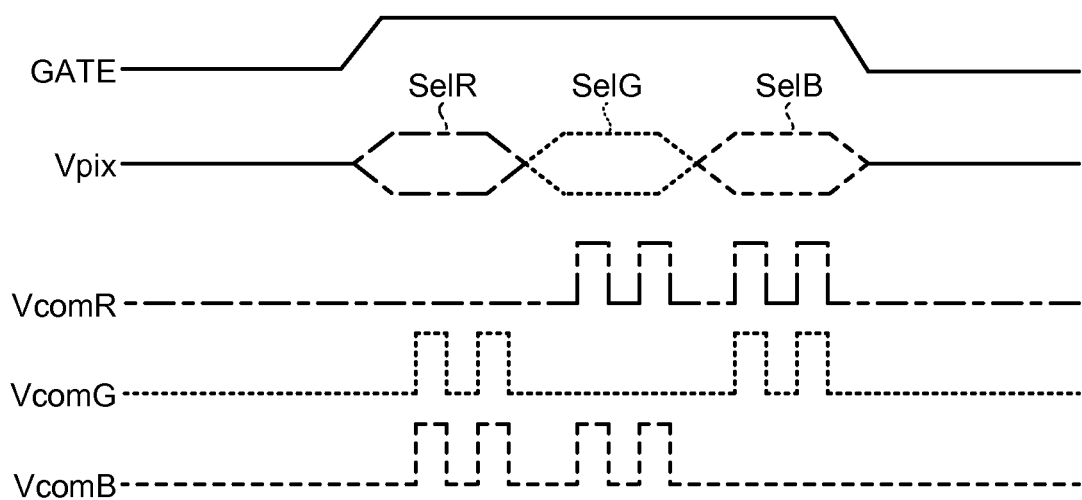
FIG. 15 is a schematic diagram illustrating a relation between the display operation period and the touch detection operation period according to a first modification of the first embodiment.

As illustrated in FIG. 15, in the period GATE in which the pixel electrodes are selected by one scanning signal by the gate driver, the display device with a touch detection function 1 applies the driving signal Vcomd for display to the drive electrode COML when the application of the pixel signal Vpix to the pixel signal line SGL corresponding to the drive electrode COML is selected by the source selector unit 13S. In the period GATE in which the gate driver 12 that applies the scanning signal to the pixel electrodes is operating, the display device with a touch detection function 1 applies the driving signals VcomR, VcomG, and VcomB as the touch driving signal Vcomt to the drive electrodes COML when the application of the pixel signal Vpix to the pixel signal lines SGL corresponding to the drive electrodes COML is not selected by the source selector unit 13S. Accordingly, the display device with a touch detection function 1 can output the touch detection signal Vdet corresponding to the external proximity object from the touch detection electrodes TDL three-dimensionally crossing the drive electrode COML and forming capacitance at the three-dimensionally crossing portion.

The drive electrode driver 14 applies the driving signal VcomR for touch detection after applying the driving signal Vcomd for display applied to the drive electrode COML in synchronization with the supply of the source signal SelB that is, after finishing the display of the corresponding pixel Pix (sub-pixels SPix). Accordingly, the drive electrode driver 14 can apply the same number of pulses of the touch driving signal Vcomt to all of the drive electrodes COML extending in parallel corresponding to each of the color regions of the color filter 32. As a result, the display device with a touch detection function 1 according to the first modification of the first embodiment can suppress influence of noise in the touch detection.

1-1D. Second Modification of First Embodiment

Figure 16:
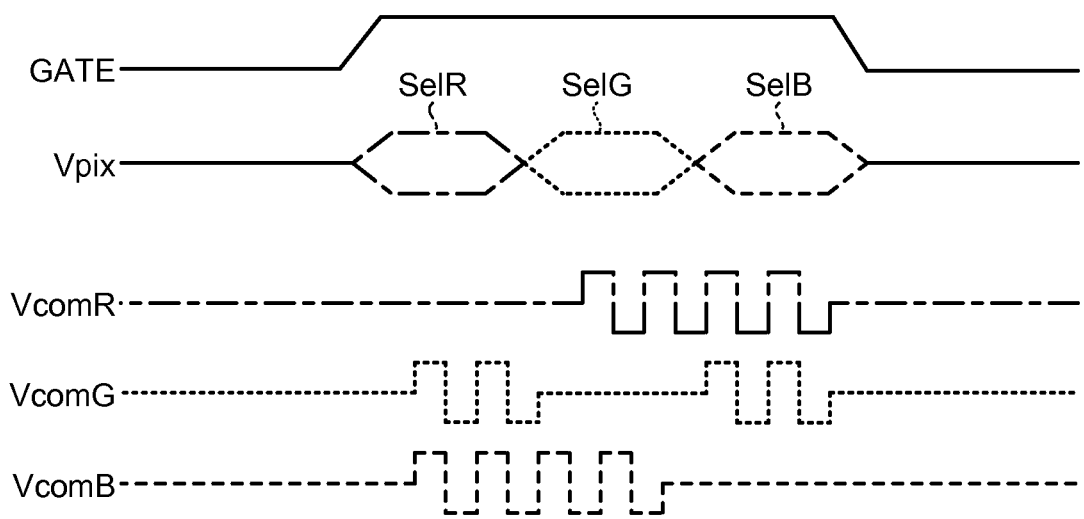
FIG. 16 is a schematic diagram illustrating a relation between the display operation period and the touch detection operation period according to a second modification of the first embodiment.

As illustrated in FIG. 16, in the period GATE in which the pixel electrodes are selected by one scanning signal by the gate driver, the display device with a touch detection function 1 applies the driving signal Vcomd for display to the drive electrode COML when the application of the pixel signal Vpix to the pixel signal line SGL corresponding to the drive electrode COML is selected by the source selector unit 13S. In the period GATE in which the gate driver 12 that applies the scanning signal to the pixel electrodes is operating, the display device with a touch detection function 1 applies the driving signals VcomR, VcomG, and VcomB as the touch driving signal Vcomt to the drive electrode COML when the application of the pixel signal Vpix to the pixel signal lines SGL corresponding to the drive electrodes COML is not selected by the source selector unit 13S. Accordingly, the display device with a touch detection function 1 can output the touch detection signal Vdet corresponding to the external proximity object from the touch detection electrodes TDL three-dimensionally crossing the drive electrode COML and forming capacitance at the three-dimensionally crossing portion.

The drive electrode driver 14 applies the driving signal VcomR for touch detection after applying the driving signal Vcomd for display applied to the drive electrode COML in synchronization with the supply of the source signal SelB that is, after finishing the display of the corresponding pixel Pix (sub-pixels SPix). The drive electrode driver 14 controls the waveform and the number of pulses of the rectangular wave so that average potential of each of the driving signals VcomR, VcomG, and VcomB is equal to that of the driving signal Vcomd for display that is applied to the drive electrode COML described above. Accordingly, fluctuation of the potential applied to the pixel electrode 22 by the drive electrode COML is reduced, and the display device with a touch detection function 1 according to the second modification of the first embodiment can reduce the influence occurred in the liquid crystal layer 6 due to the application of the driving signal VcomR. The drive electrode driver 14 can apply the same number of pulses of the touch driving signal Vcomt to all of the drive electrodes COML extending in parallel corresponding to each of the color regions of the color filter 32. As a result, the display device with a touch detection function 1 according to the second modification of the first embodiment can suppress the influence of noise in the touch detection.

1-1E. Advantages

The display device with a touch detection function 1 can perform display and touch detection even when the scanning signal is applied from the gate driver. Accordingly, the display device with a touch detection function 1 can secure time for the touch detection even if a screen size or definition of the display device is increased. The display device with a touch detection function 1 can suppress possibility of being weak against a noise and the like because the display device can secure the time for performing the touch detection. As a result, the display device with a touch detection function 1 can be reduced in thickness, increased in the screen size, or increased in the definition.

1-2. Second Embodiment

Figure 17:
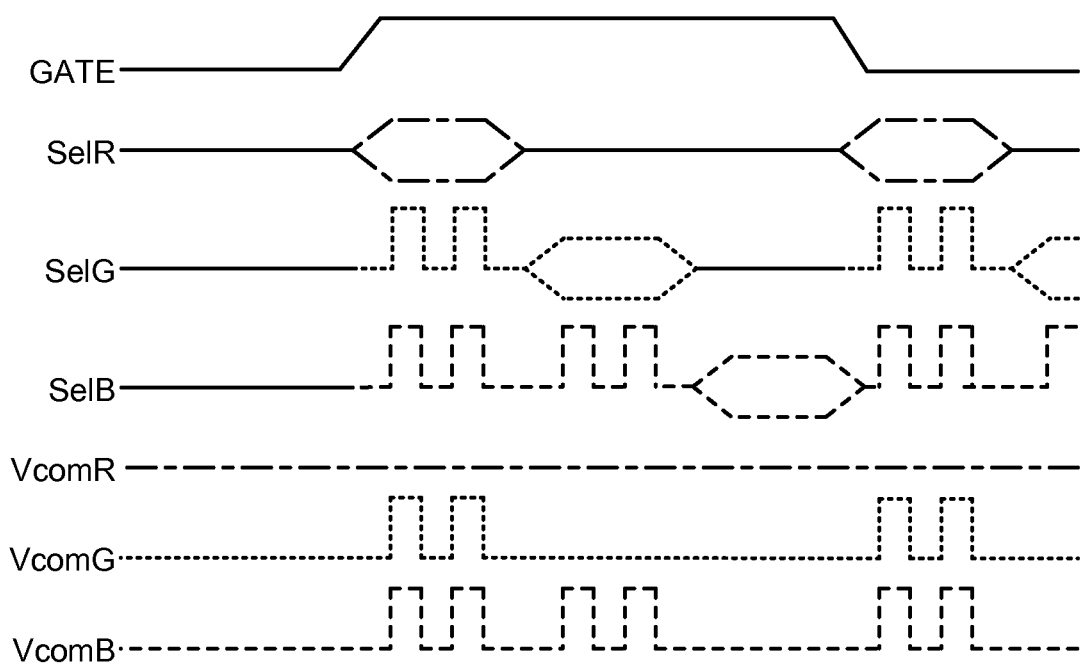
FIG. 17 is a schematic diagram illustrating a relation between the display operation period and the touch detection operation period according to a second embodiment.
Figure 18:
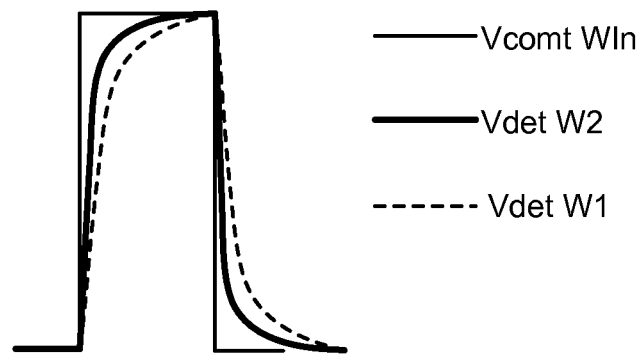
FIG. 18 is an explanatory diagram for explaining an evaluation of a display device with a touch detection function according to the second embodiment.

Next, the following describes the display device with a touch detection function 1 according to a second embodiment. FIG. 17 is a schematic diagram illustrating a relation between the display operation period and the touch detection operation period according to the second embodiment. FIG. 18 is an explanatory diagram for explaining an evaluation of a display device with a touch detection function according to the second embodiment. The same components as those described in the first embodiment are denoted by the same reference numerals, and redundant description is not repeated here.

The display device with a touch detection function 1 according to the second embodiment applies the touch driving signal Vcomt to the drive electrode COML, and supplies the touch driving signal Vcomt to the pixel signal line SGL opposed to the drive electrode COML, in the direction orthogonal thereto, to which the touch driving signal Vcomt is applied. As illustrated in FIG. 8, the drive electrode COML of the second embodiment extends in a direction parallel to the direction along which the pixel signal line SGL extends. Accordingly, as illustrated in FIG. 17, the drive electrode driver 14 can supply the same rectangular wave of the touch driving signal Vcomt to both the drive electrode COML to which the touch driving signal Vcomt is applied and the pixel signal line SGL overlapping with the drive electrode COML in the direction orthogonal to the TFT substrate 21. As a result, the display device with a touch detection function 1 can reduce parasitic capacitance between the drive electrode COML and the pixel signal line SGL.

For example, as illustrated in FIG. 17, the drive electrode driver 14 may supply the same rectangular wave of the touch driving signal Vcomt to both the drive electrode COML to which the driving signal VcomG is applied as the touch driving signal Vcomt and the pixel signal line SGL overlapping with the drive electrode COML in the direction orthogonal to the TFT substrate 21, while the source signal SelR of the pixel signal Vpix is supplied. As illustrated in FIG. 17, the drive electrode driver 14 may supply the same rectangular wave of the touch driving signal Vcomt to both the drive electrode COML to which the driving signal VcomB is applied as the touch driving signal Vcomt and the pixel signal line SGL overlapping with the drive electrode COML in the direction orthogonal to the TFT substrate 21, while the source signal SelR of the pixel signal Vpix are supplied, and while the source signal SelG of the pixel signal Vpix are supplied. In the period GATE in which the pixel electrodes are selected by one scanning signal by the gate driver, after the source signal SelR is applied to the selection signal line (pixel signal line SGL) selected by the source selector unit, the driving signal VcomR for touch detection is not applied to the drive electrode COML opposed to the pixel electrode corresponding to the selected selection signal line (pixel signal line SGL). After the source signal SelR is applied, the selection signal line (pixel signal line SGL) becomes in a floating state in which potential is not fixed.

As illustrated in FIG. 18, when an input sampling waveform VcomtWIn is applied to the drive electrode COML as the touch driving signal Vcomt, the display device with a touch detection function 1 according to the first embodiment detects a detection waveform VdetW1 as the touch detection signal Vdet at the touch detection electrode TDL. As illustrated in FIG. 18, when the input sampling waveform VcomtWIn is applied to the drive electrode COML as the touch driving signal Vcomt, the display device with a touch detection function 1 according to the second embodiment detects a detection waveform VdetW2 as the touch detection signal Vdet at the touch detection electrode TDL.

In the display device with a touch detection function 1 according to the first embodiment, when the drive electrode COML three-dimensionally crosses the pixel signal line SGL, it may take time to charge and discharge the drive electrode COML due to influence of the parasitic capacitance between the drive electrode COML and the pixel signal line SGL. In the display device with a touch detection function 1 according to the second embodiment, the same rectangular wave of the touch driving signal Vcomt is supplied to both the drive electrode COML to which the touch driving signal Vcomt is applied and the pixel signal line SGL overlapping with the drive electrode COML in the direction orthogonal to the TFT substrate 21, so that the parasitic capacitance between the drive electrode COML and the pixel signal line SGL is suppressed.

Since the parasitic capacitance between the drive electrode COML and the pixel signal line SGL is suppressed, when the input sampling waveform VcomtWIn is applied to the drive electrode COML, the time constant of the detection waveform as the touch detection signal Vdet is reduced at the touch detection electrode TDL in the display device with a touch detection function 1 according to the second embodiment to increase the frequency of the driving signal for touch detection. For example, as illustrated in FIG. 18, the shape of the detection waveform VdetW2 is closer to that of the input sampling waveform VcomtWIn than that of the detection waveform VdetW1. Therefore, the display device with a touch detection function 1 according to the second embodiment can detect the detection waveform VdetW2 as the touch detection signal Vdet at the touch detection electrode TDL even if sampling frequency of the touch driving signal Vcomt is increased. As described above, the display device with a touch detection function 1 according to the second embodiment can suppress the influence of the charge and discharge when the parasitic capacitance between the drive electrode COML and the pixel signal line SGL is suppressed. Accordingly, the frequency of the rectangular wave of the touch driving signal Vcomt may be increased. As a result, the display device with a touch detection function 1 according to the first embodiment can suppress the influence of a low frequency noise due to an AC power supply. The display device with a touch detection function 1 according to the second embodiment can increase the frequency of the rectangular wave of the touch driving signal Vcomt supplied to the drive electrode COML, and can perform touch detection in a short time. Accordingly, the display device with a touch detection function 1 according to the second embodiment can be adapted to the touch detection device 30 even if the screen size or the definition is increased. In the display device with a touch detection function 1 according to the second embodiment, the parasitic capacitance between the drive electrode COML and the pixel signal line SGL can be reduced even when the distance between the drive electrode COML and the pixel signal line SGL is shortened, so that the thickness of the display unit with a touch detection function 10 can be reduced.

Advantages

The display device with a touch detection function 1 according to the second embodiment can perform display and touch detection even when the scanning signal is applied from the gate driver. Accordingly, the display device with a touch detection function 1 can secure time for the touch detection even if a screen size or definition of the display device is increased. The display device with a touch detection function 1 can suppress possibility of being weak against a noise and the like because the display device can secure the time for performing the touch detection. As a result, the display device with a touch detection function 1 can be reduced in thickness, increased in the screen size, or increased in the definition. The display device with a touch detection function 1 can increase the sampling frequency of the touch driving signal Vcomt to suppress the power consumption of the touch detection. Accordingly, electric power supplied to the touch detection unit 40 can be suppressed, so that the driver IC may be reduced in size. As a result, an electronic apparatus including the display device with a touch detection function 1 according to the second embodiment can be reduced in size.

1-3. Third Embodiment

Figure 19:
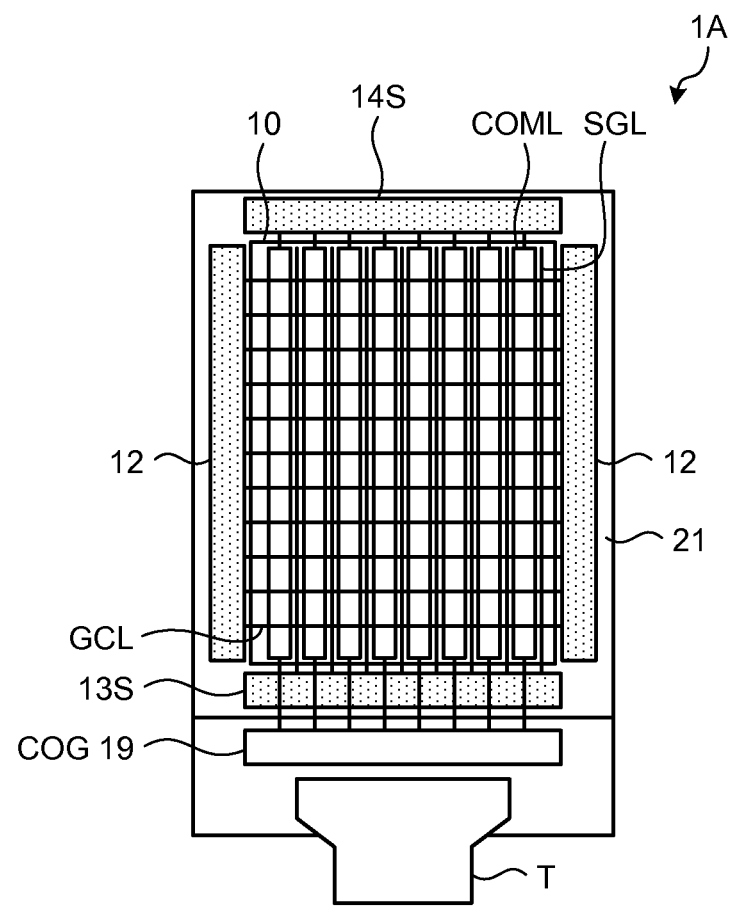
FIG. 19 illustrates an example of a module on which a display device with a touch detection function according to a third embodiment is mounted.
Figure 20:
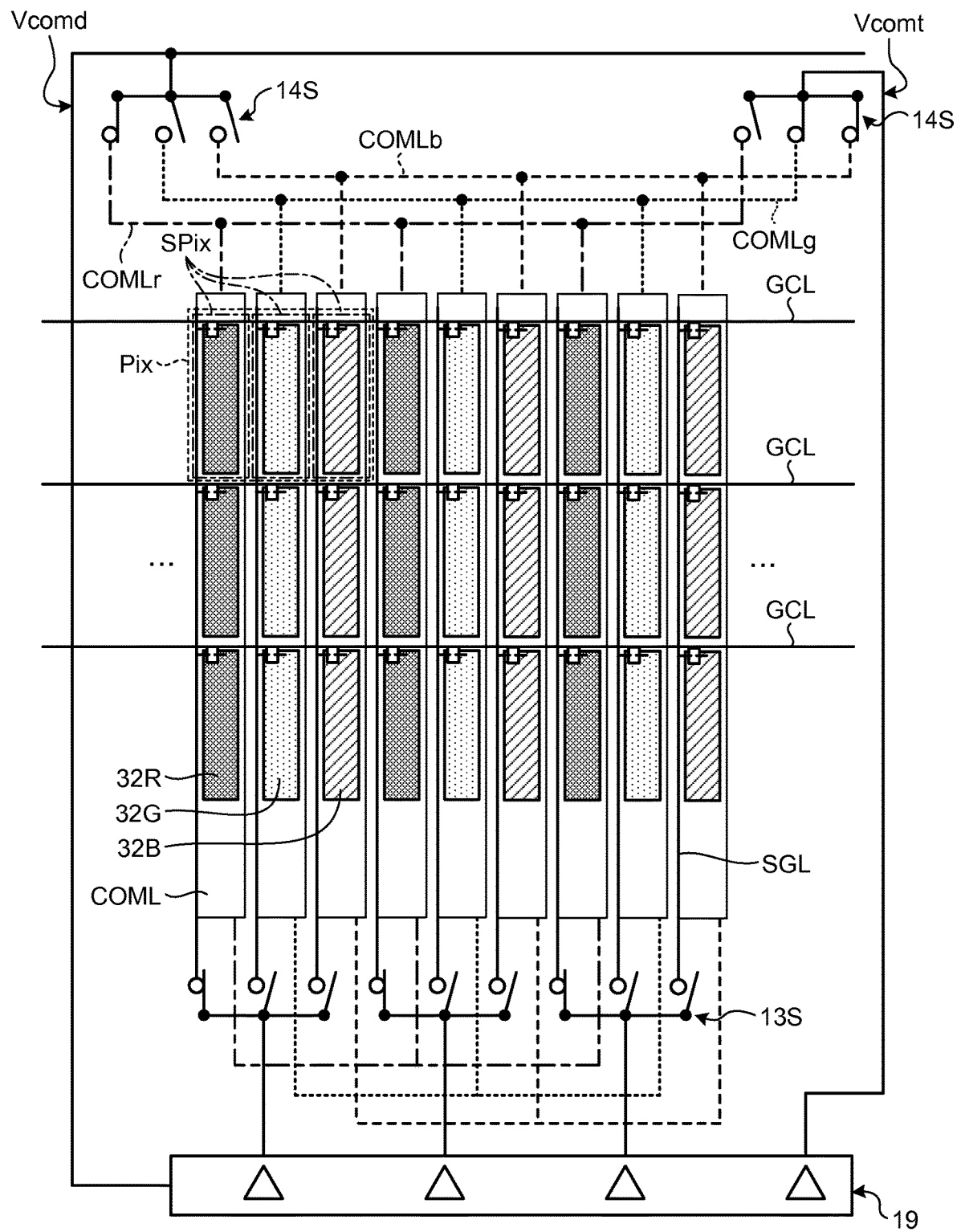
FIG. 20 is a schematic diagram for explaining a relation between the drive electrode and the pixel signal line in the module on which the display device with a touch detection function according to the third embodiment is mounted.

Next, the following describes a display device with a touch detection function 1A according to a third embodiment. FIG. 19 illustrates an example of a module on which the display device with a touch detection function according to the third embodiment is mounted. FIG. 20 is a schematic diagram for explaining a relation between the drive electrode and the pixel signal line in the module on which the display device with a touch detection function according to the third embodiment is mounted. The same components as those described in the first embodiment and the second embodiment are denoted by the same reference numerals, and redundant description is not repeated here.

In FIG. 19, in the display unit with a touch detection function 10 of the display device with a touch detection function 1A, the drive electrode COML and the scanning signal line GCL are schematically illustrated, the scanning signal line GCL being coupled to the gate driver 12 that is formed to three-dimensionally cross the drive electrode COML, in the direction orthogonal to the surface of the TFT substrate 21. Also in FIG. 19, in the display unit with a touch detection function 10, the drive electrode COML and the pixel signal line SGL are schematically illustrated, the pixel signal line SGL being formed to extend in a direction parallel to the drive electrode COML without crossing, in the direction orthogonal to the surface of the TFT substrate 21. The driving signal selector unit 14S and the COG 19 that includes the drive electrode driver 14 are arranged to sandwich both ends in the extending direction of the drive electrode COML.

As illustrated in FIG. 20, in the display device with a touch detection function 1A, the pixel signal line SGL is coupled to the source driver 13 incorporated in the COG 19 via the source selector unit 13S. The source selector unit 13S opens and closes corresponding to the switch control signal SLS. The driving signal selector unit 14S and the source selector unit 13S are arranged to sandwich both ends in the extending direction of the drive electrode COML. The driving signal selector unit 14S also opens and closes corresponding to the switch control signal SLC. In the display device with a touch detection function 1A, the drive electrode COML is coupled to the drive electrode driver 14 incorporated in the COG 19. The color filter 32 includes the color regions 32R, 32G, and 32B colored in the three colors, red (R), green (G), and blue (B). The color filter 32 is opposed to the drive electrodes COML in the direction orthogonal to the TFT substrate 21, and overlaps the drive electrodes COML in the orthogonal direction to the surface of the TFT substrate 21.

As illustrated in FIG. 20, the drive electrode COML according to the third embodiment extends in the direction parallel to the direction along which the pixel signal line SGL extends. For example, the display device with a touch detection function 1A disconnects between the drive electrode COML and the pixel signal line SGL according to the switch control signal SLC, applies the driving signal vcomd for display to the drive electrode COML, and supplies the pixel signal Vpix for displaying an image on the pixel electrode to the pixel signal line SGL. The display device with a touch detection function 1A couples the drive electrode COML with the pixel signal line SGL according to the switch control signal SLC.

Advantages

As described above, in the display device with a touch detection function 1A according to the third embodiment, the driving signal selector unit 14S and the source selector unit 13S are arranged to sandwich both ends in the extending direction of the drive electrode COML. Accordingly, an area of a picture frame is reduced because wiring can be omitted, so that the screen size or the definition of the display unit with a touch detection function 10 can be increased.

Hereinabove, although some embodiments and modifications are exemplified to explain the present disclosure, the present disclosure is not limited thereto and may be variously modified. In the display devices with a touch detection function 1, 1A according to the embodiments and the modifications, the drive electrodes COML extend in parallel to each other for each of the color regions 32R, 32G, and 32B colored in the three colors, red (R), green (G), and blue (B) in the color filter 32. As a modification, in the display device with a touch detection function, the drive electrodes COML may extend in parallel to each other for each width constituted of the color regions 32R and 32G, and each width of the color region 32B, among the color regions 32R, 32G, and 32B colored in the three colors, red (R), green (G), and blue (B) in the color filter 32. In the display device with a touch detection function, the drive electrodes COML may extend in parallel to each other for each width constituted of the color regions 32G and 32B, and each width of the color region 32R, among the color regions 32R, 32G, and 32B. Alternatively, in the display device with a touch detection function, the drive electrodes COML may extend in parallel to each other for each width constituted of the color regions 32R and 32B, and each width of the color region 32G, among the color regions 32R, 32G, and 32B.

For example, when one pixel is displayed using four sub-pixels Spix, each of the drive electrodes COML may be formed to have a width including two sub-pixels in a plan view. That is, each of the drive electrodes COML may be formed to have a width including, in a plan view, the sub-pixels Spix of which number is smaller than the number of one or more pixel signal lines SGL selectable by the source selector unit 13S in the direction orthogonal to the direction along which the pixel signal line SGL extends. Accordingly, the number of the drive electrodes COML scanned by the drive electrode driver 14S becomes smaller than the number of the pixel signal lines SGL selectable by the source selector unit 13S. In such a case, the drive electrode driver 14 can apply the touch driving signal Vcomt to each of the drive electrodes COML only when the application of the pixel signal is not selected by the source selector unit 13S for any of the opposing pixel electrodes.

In the display devices with a touch detection function 1, 1A according to the embodiments and the modifications described above, the liquid crystal display unit 20 using liquid crystals in various modes such as TN, VA, and ECB, and the touch detection device 30 may be integrated to be the display unit with a touch detection function 10. Alternatively, in the display unit with a touch detection function 10, the touch detection device may be integrated with a liquid crystal display device using a liquid crystal of a horizontal electric field mode such as a fringe field switching (FFS) or an in-plane switching (IPS) mode.

For example, the display device with a touch detection function 1, 1A may use the liquid crystal in the horizontal electric field mode. In the above embodiments, a touch drive electrode is also used as a display drive electrode. However, even when they are separately provided and driven, touch detection can be performed while suppressing influence of an external noise or a noise transmitted from the liquid crystal display device (corresponding to an internal noise in the above embodiments) by implementing the above-described configuration in the same region in which the touch drive electrode is opposed to the display drive electrode.

In such a case, places where the touch drive electrode, the display drive electrode, and the touch detection electrode are arranged are not limited to those of the embodiment. Both the touch drive electrode and the touch detection electrode may be an on-cell type that is mounted on the liquid crystal display device, or both may be arranged inside the liquid crystal display device. The display device according to the present disclosure is not limited to the liquid crystal display device, and may be an organic EL display device.

2. Application Example

Next, with reference to FIG. 21 to FIG. 32, the following describes an application example of the display device with a touch detection function 1 described in the embodiments and the modifications. FIG. 21 to FIG. 32 illustrate an example of the electronic apparatus to which the display device with a touch detection function according to the embodiments is applied. The display device with a touch detection function 1 according to the first, second, and third embodiments and the modifications thereof may be applied to electronic apparatuses in various fields such as a television apparatus, a digital camera, a notebook-type personal computer, a portable electronic apparatus such as a cellular phone, or a video camera. In other words, the display device with a touch detection function 1 according to the first, second, and third embodiments and the modifications thereof may be applied to electronic apparatuses in various fields that display a video signal input from the outside or a video signal generated inside as an image or a video.

2-1. Application Example 1

Figure 21:
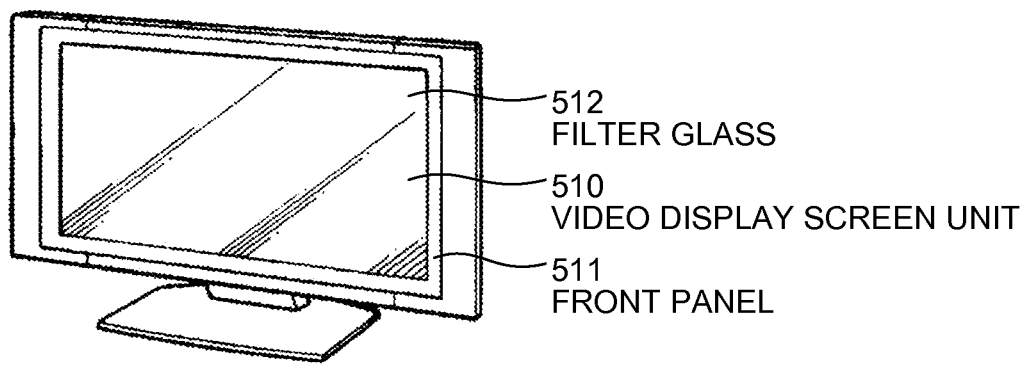
FIG. 21 illustrates an example of an electronic apparatus to which the display device with a touch detection function according to the embodiments is applied.

An electronic apparatus illustrated in FIG. 21 is a television apparatus to which the display device with a touch detection function 1 according to the first, second, and third embodiments and the modifications thereof is applied. For example, the television apparatus has a video display screen unit 510 including a front panel 511 and a filter glass 512, and the video display screen unit 510 is the display device with a touch detection function according to the first, second, and third embodiments and the modifications thereof.

2-2. Application Example 2

Figure 22:
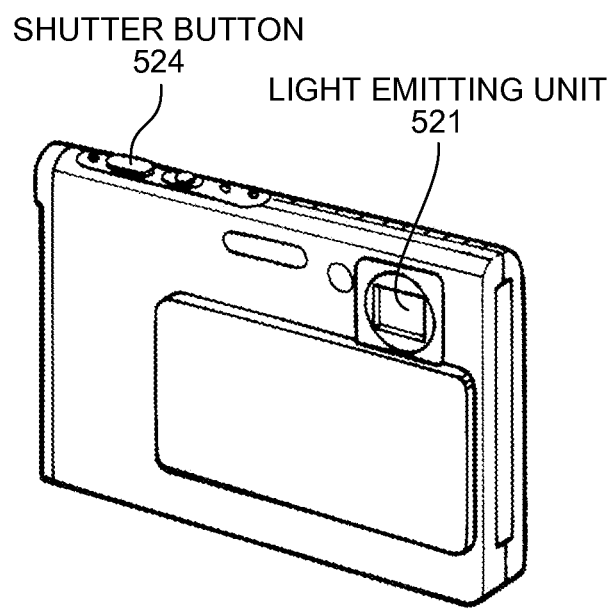
FIG. 22 illustrates an example of the electronic apparatus to which the display device with a touch detection function according to the embodiments is applied.
Figure 23:
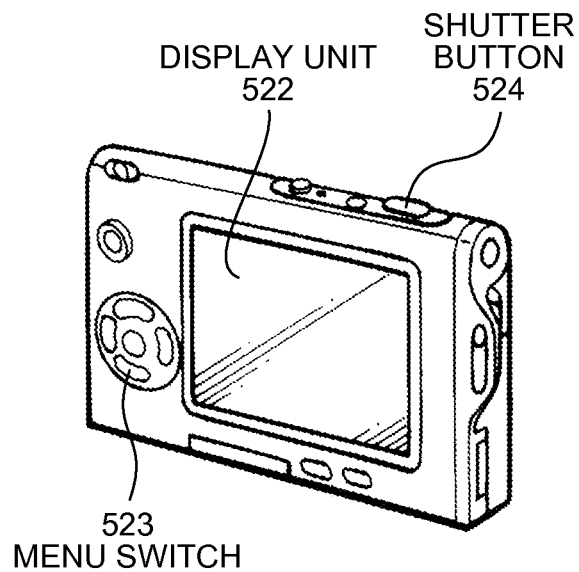
FIG. 23 illustrates an example of the electronic apparatus to which the display device with a touch detection function according to the embodiments is applied.

An electronic apparatus illustrated in FIG. 22 and FIG. 23 is a digital camera to which the display device with a touch detection function 1 according to the first, second, and third embodiments and the modifications thereof is applied. For example, the digital camera has a flash light emitting unit 521, a display unit 522, a menu switch 523, and a shutter button 524, and the display unit 522 is the display device with a touch detection function according to the first, second, and third embodiments and the modifications thereof.

2-3. Application Example 3

Figure 24:
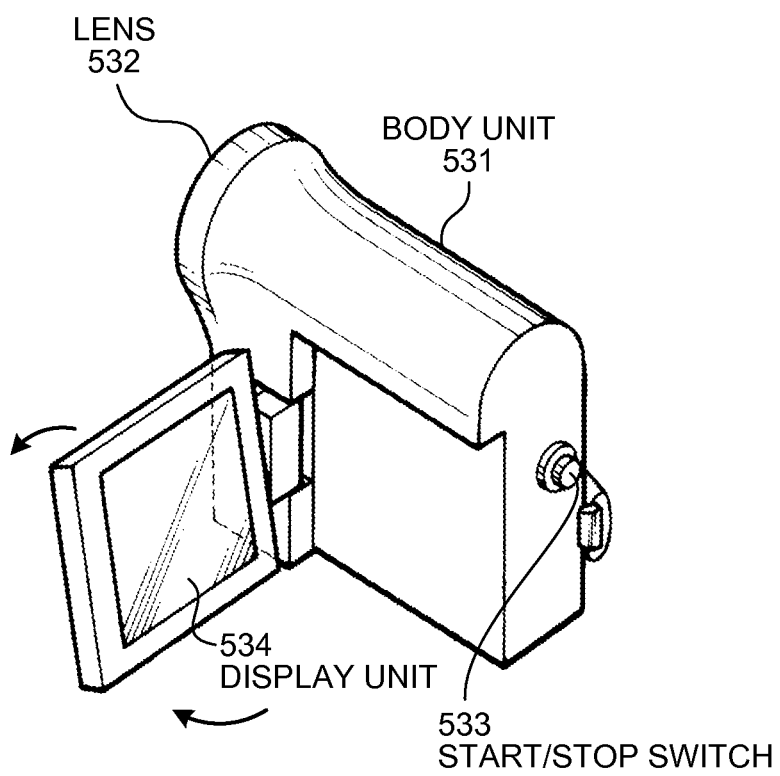
FIG. 24 illustrates an example of the electronic apparatus to which the display device with a touch detection function according to the embodiments is applied.

An electronic apparatus illustrated in FIG. 24 represents an external appearance of a video camera to which the display device with a touch detection function 1 according to the first, second, and third embodiments and the modifications thereof is applied. For example, the video camera includes a body unit 531, a lens 532 for photographing a subject provided on a front side surface of the body unit 531, a photographing start/stop switch 533, and a display unit 534. The display unit 534 is the display device with a touch detection function according to the first, second, and third embodiments and the modifications thereof.

2-4. Application Example 4

Figure 25:
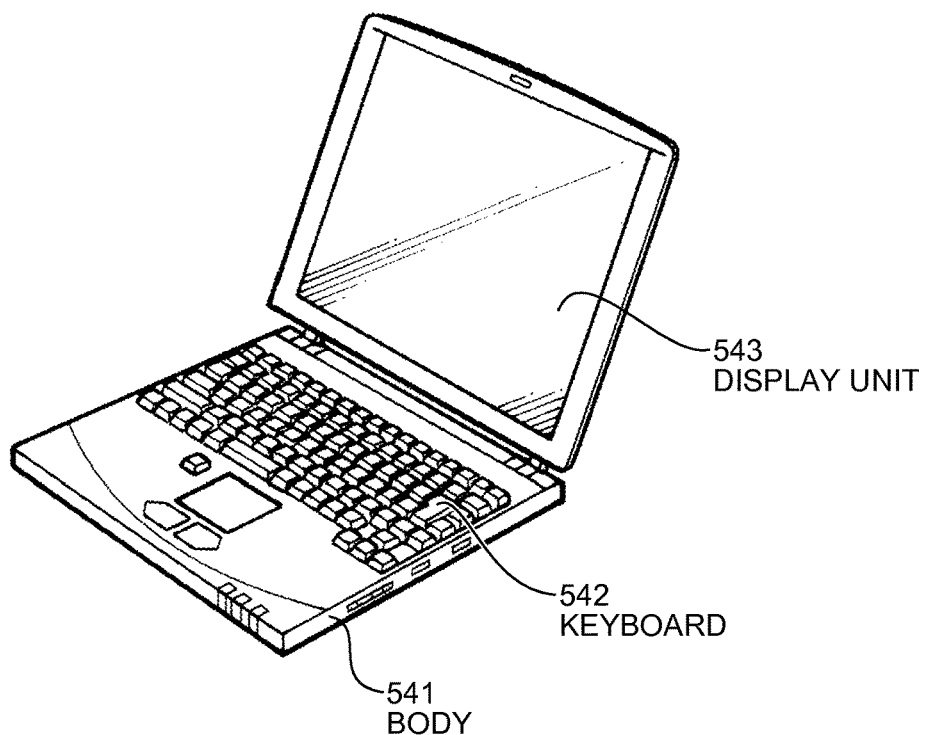
FIG. 25 illustrates an example of the electronic apparatus to which the display device with a touch detection function according to the embodiments is applied.
Figure 26:
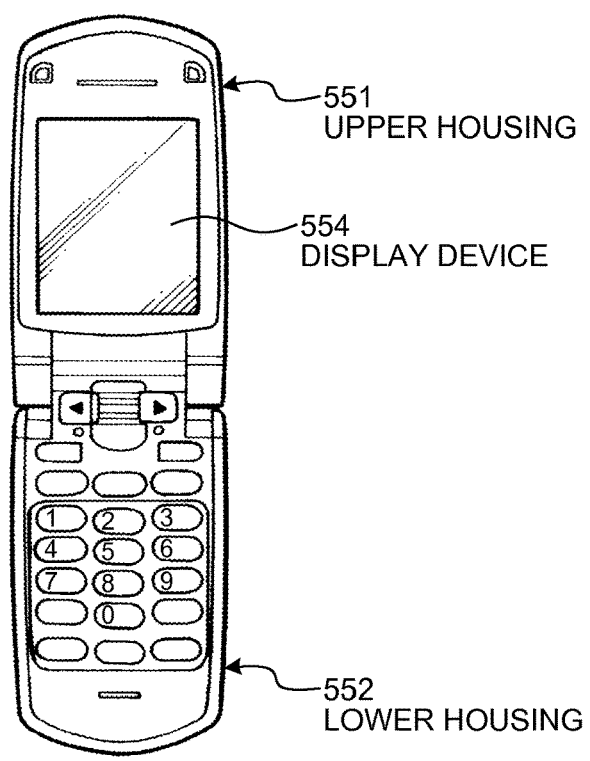
FIG. 26 illustrates an example of the electronic apparatus to which the display device with a touch detection function according to the embodiments is applied.
Figure 27:
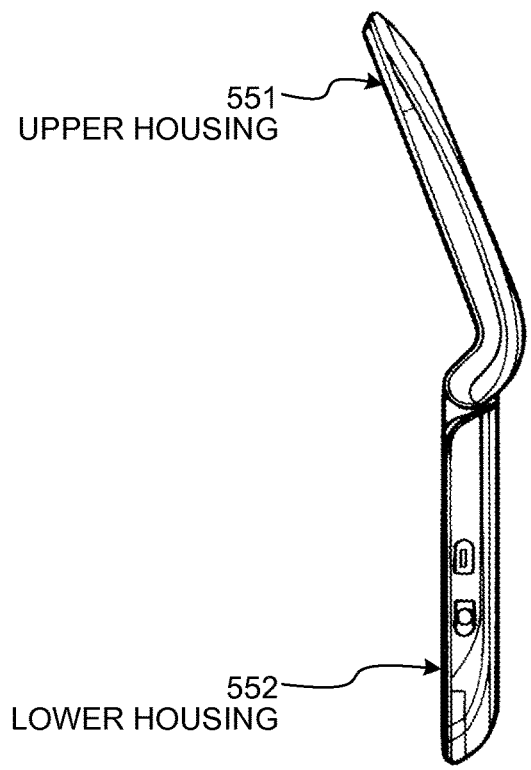
FIG. 27 illustrates an example of the electronic apparatus to which the display device with a touch detection function according to the embodiments is applied.
Figure 28:
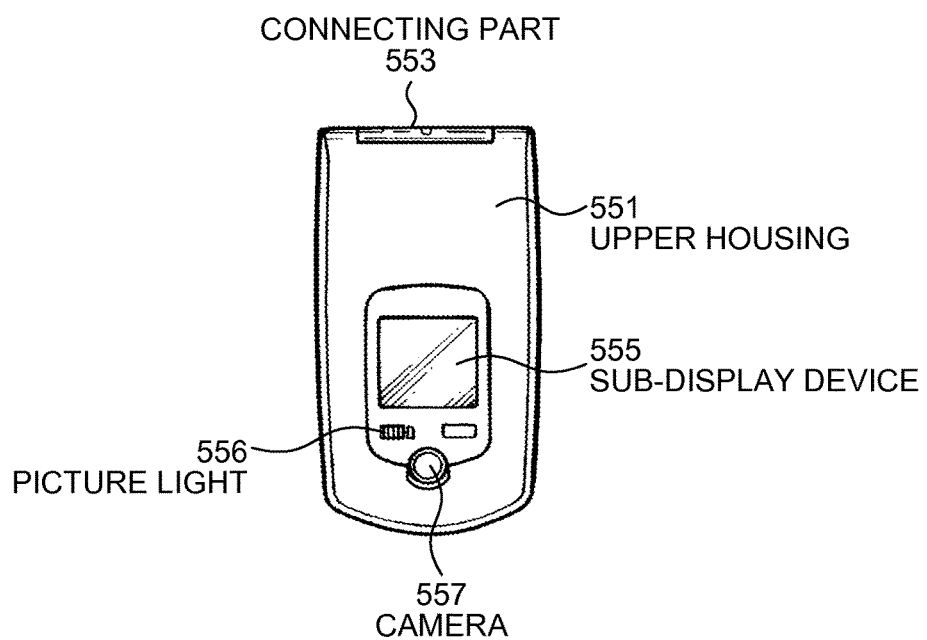
FIG. 28 illustrates an example of the electronic apparatus to which the display device with a touch detection function according to the embodiments is applied.
Figure 29:
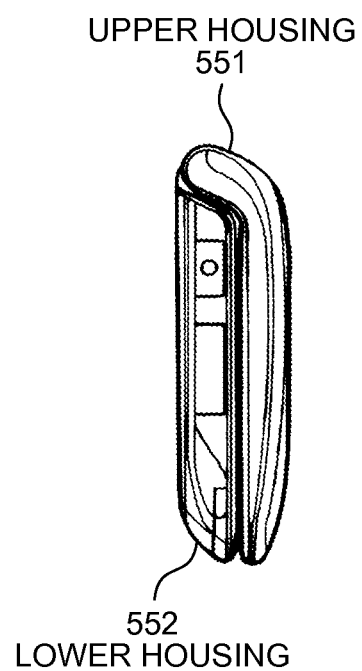
FIG. 29 illustrates an example of the electronic apparatus to which the display device with a touch detection function according to the embodiments is applied.
Figure 30:
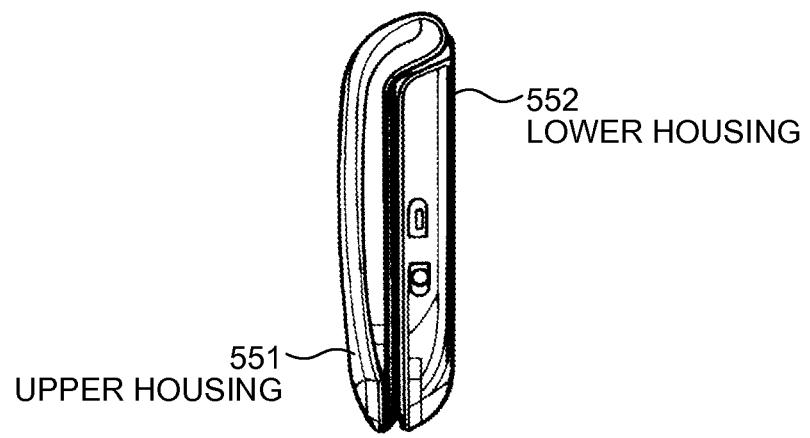
FIG. 30 illustrates an example of the electronic apparatus to which the display device with a touch detection function according to the embodiments is applied.
Figure 31:
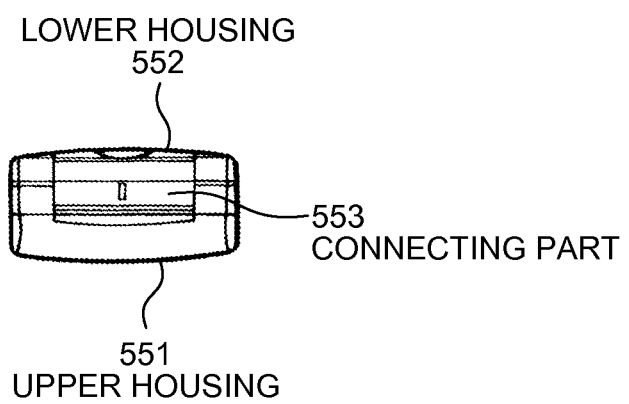
FIG. 31 illustrates an example of the electronic apparatus to which the display device with a touch detection function according to the embodiments is applied.
Figure 32:
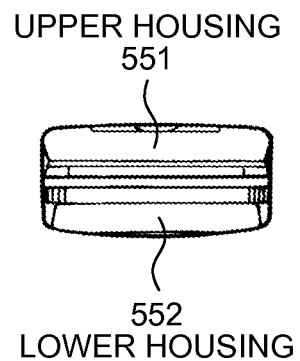
FIG. 32 illustrates an example of the electronic apparatus to which the display device with a touch detection function according to the embodiments is applied.

An electronic apparatus illustrated in FIG. 25 is a notebook-type personal computer to which the display device with a touch detection function 1 according to the first, second, and third embodiments and the modifications thereof is applied. For example, the notebook-type personal computer includes a body 541, a keyboard 542 for an input operation of characters and the like, and a display unit 543 for displaying an image, and the display unit 543 is the display device with a touch detection function according to the first, second, and third embodiments and the modifications thereof.

2-5. Application Example 5

An electronic apparatus illustrated in FIG. 26 to FIG. 32 is a cellular phone to which the display device with a touch detection function 1 according to the first, second, and third embodiments and the modifications thereof is applied. For example, the cellular phone is formed by connecting an upper housing 551 and a lower housing 552 with a connecting part (hinge part) 553, and includes a display device 554, a sub-display device 555, a picture light 556, and a camera 557. The display device 554 or the sub-display device 555 is the display device with a touch detection function according to the first, second, and third embodiments and the modifications thereof.

3. Aspects of Present Disclosure

The present disclosure includes the following aspects.
(1) A display device with a touch detection function comprising:
  a substrate;
  a plurality of pixel electrodes arranged in a matrix above a plane parallel to the substrate;
  a plurality of signal lines that extend above a plane parallel to a surface of the substrate and supply a pixel signal for displaying an image to the plurality of pixel electrodes;
  a display function layer that exerts an image display function based on the pixel signal;
  a plurality of drive electrodes that are opposed to the plurality of pixel electrodes in a vertical direction orthogonal to the surface of the substrate, and are arranged to be scanned in a direction different from a direction along which the plurality of signal lines extend;
  a plurality of touch detection electrodes that are opposed to the plurality of drive electrodes in the vertical direction and capacitively coupled with the plurality of drive electrodes;
  a gate driver that applies a scanning signal for selecting the plurality of pixel electrodes;
  a drive electrode driver that applies a touch driving signal for touch detection to the plurality of drive electrodes;
  a source driver that applies the pixel signal to the plurality of pixel electrodes; and
  a source selector unit that selects a signal line to which the source driver applies the pixel signal among the plurality of signal lines, wherein
  the drive electrode driver applies the touch driving signal to a drive electrode opposed only to a pixel electrode corresponding to a non-selection signal line in which the application of the pixel signal is not selected by the source selector unit, among pixel electrodes selected by one scanning signal by the gate driver.
(2) The display device with a touch detection function according to (1), wherein in the drive electrode driver, a touch driving signal is not applied to a drive electrode opposed to a pixel electrode corresponding to a selection signal line in which the application of the pixel signal is selected by the source selector unit, among pixel electrodes selected by one scanning signal by the gate driver.
(3) The display device with a touch detection function according to (1), wherein number of the drive electrodes scanned by the drive electrode driver is smaller than number of signal lines that is selectable by the source selector unit.
(4) The display device with a touch detection function according to (1), wherein each of the plurality of drive electrode has a length equal to a width at which a pixel displayed by a pixel electrode corresponding to the selection signal line intersects at right angle with the direction along which the plurality of signal lines extend.
(5) The display device with a touch detection function according to (4), wherein the pixel is a sub-pixel that performs monochrome color display, and the source selector unit sequentially selects a plurality of sub-pixels that display an image in combination with each other.
(6) The display device with a touch detection function according to (5), wherein the drive electrode driver comprises a driving signal selector unit that selects a drive electrode for applying the touch driving signal, and
the driving signal selector unit electrically couples the drive electrode for applying the touch driving signal and a sub-pixel that performs color display similar to that of a sub-pixel opposed to the drive electrode.
(7) The display device with a touch detection function according to (1), wherein the drive electrode driver applies the touch driving signal to a drive electrode opposed to the pixel electrode before the source selector unit selects a signal line to be applied with the pixel signal, in a period in which a plurality of pixel electrodes are selected by one scanning signal by the gate driver.
(8) The display device with a touch detection function according to (7), wherein the touch driving signal is not applied to a drive electrode opposed to a pixel electrode corresponding to a selection signal line in which the application of the pixel signal is selected by the source selector unit.
(9) The display device with a touch detection function according to (2), wherein the drive electrode driver applies the touch driving signal to a signal line of a pixel electrode opposed, in the vertical direction, to the drive electrode to which the touch driving signal is applied.
(10) The display device with a touch detection function according to (2), wherein the drive electrode driver applies a display driving signal for display to the plurality of drive electrodes, and performs control so that average potential of the display driving signal is equal to average potential of the touch driving signal.
(11) The display device with a touch detection function according to (1), wherein the plurality of touch detection electrodes detect an external proximity object approaching from the outside based on a change in capacitance caused by proximity or contact of the external proximity object.
(12) The display device with a touch detection function according to (1), wherein the driving signal selector unit and the source selector unit are arranged to sandwich both ends in an extending direction of the plurality of drive electrodes when the substrate is viewed in the vertical direction.
(13) The display device with a touch detection function according to (1), wherein the plurality of drive electrodes extend in a direction parallel to a direction along which the plurality of signal lines extend, and the plurality of touch detection electrodes extend in a direction different from a direction along which the plurality of signal lines extend.
(14) A method for driving a display device with a touch detection function, the method comprising:
  in a period in which a plurality of pixel electrodes are selected by one scanning signal by a gate driver, applying a display driving signal for display to a drive electrode when an application of a pixel signal to a signal line is selected by a source selector unit; applying a touch driving signal for touch detection to the drive electrode when application of the pixel signal to the signal line is not selected by the source selector unit; and outputting a touch detection signal corresponding to an external proximity object approaching from the outside from a plurality of touch detection electrodes three-dimensionally crossing the plurality of drive electrodes and forming capacitance at the three-dimensionally crossing portion.
(15) An electronic apparatus having a display device with a touch detection function capable of detecting an external proximity object, the display device with a touch detection function comprising:

a substrate;

a plurality of pixel electrodes arranged in a matrix above a plane parallel to the substrate;

a plurality of signal lines that extend above a plane parallel to a surface of the substrate and supply a pixel signal for displaying an image to the plurality of pixel electrodes;

a display function layer that exerts an image display function based on the pixel signal;

a plurality of drive electrodes that are opposed to the plurality of pixel electrodes in a vertical direction orthogonal to the surface of the substrate, and are arranged to be scanned in a direction different from a direction along which the plurality of signal line extend;

a plurality of touch detection electrodes that are opposed to the drive electrodes in the vertical direction and capacitively coupled with the plurality of drive electrodes;

a gate driver that applies a scanning signal for selecting the plurality of pixel electrodes;

a drive electrode driver that applies a touch driving signal for touch detection to the plurality of drive electrodes;

a source driver that applies the pixel signal to the plurality of pixel electrodes; and a source selector unit that selects a signal line to which the source driver applies the pixel signal among the plurality of signal lines, wherein the drive electrode driver applies the touch driving signal to a drive electrode opposed only to a pixel electrode corresponding to a non-selection signal line in which the application of the pixel signal is not selected by the source selector unit, among pixel electrodes selected by one scanning signal by the gate driver.

With the display device with a touch detection function, a method for driving the display device with a touch detection function, and the electronic apparatus of the present disclosure, reduction in thickness, increase in a screen size, or increase in definition can be achieved.

With the display device with a touch detection function, a method for driving the display device with a touch detection function, and the electronic apparatus of the present disclosure, the time for the touch detection can be secured even when the screen size or the definition of the display device is increased. With the display device with a touch detection function, a method for driving the display device with a touch detection function, and the electronic apparatus of the present disclosure, the time for the touch detection can be secured, so that a possibility to be weak against noise and the like may be reduced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:

a substrate;

a plurality of pixels arranged in a matrix, each pixel including a plurality of sub-pixels, each sub-pixel including a drive electrode, a pixel electrode opposed to the drive electrode in a vertical direction orthogonal to a surface of the substrate, and a touch detection electrode opposed to the drive electrode in the vertical direction and capacitively coupled with the drive electrode;

a plurality of signal lines that supply a pixel signal for displaying an image to the respective pixel electrodes;

a display function layer that exerts an image display function based on the pixel signal;

a gate driver that applies a scanning signal for selecting the respective pixel electrodes;

a drive electrode driver that applies a touch driving signal for touch detection or a common signal for display to the respective drive electrodes;

a source driver that applies the pixel signal to the respective pixel electrodes; and a source selector unit that selects a signal line to which the source driver applies the pixel signal among the plurality of signal lines, wherein at least one of the pixels includes a first sub-pixel having a first pixel electrode and a first drive electrode, and a different second sub-pixel having a second pixel electrode and a second drive electrode, and wherein the second sub-pixel is located next to the first sub-pixel in a first direction different from a second direction along which the signal lines extend, and the first sub-pixel and the second sub-pixel are provided within a same pixel, when the pixel signal is provided to the first pixel electrode and the common signal is provided to the first drive electrode, the second pixel electrode is in a floating state and the touch driving signal is provided to the second drive electrode, thereby enabling the image display function on the first sub-pixel and the touch detection function on the second sub-pixel to occur concurrently.

2. The display device with a touch detection function according to claim 1, wherein the drive electrodes supplied with the touch driving signal by the drive electrode driver are smaller in number than signal lines selectable by the source selector unit and supplied with the pixel signal by the source driver.

3. The display device with a touch detection function according to claim 1, wherein each drive electrode has a width equal to a width of each pixel electrode in the first direction.

4. The display device with a touch detection function according to claim 3, wherein each sub-pixel is a sub-pixel that performs monochrome color display, and the source selector unit sequentially selects a plurality of sub-pixels that display an image in combination with each other.

5. The display device with a touch detection function according to claim 1, wherein the drive electrode driver applies the touch driving signal to the second drive electrode opposed to the second pixel electrode before the source selector unit selects a signal line for the second pixel electrode, in a period in which the first and second pixel electrodes are selected by one scanning signal applied by the gate driver.

6. The display device with a touch detection function according to claim 1, wherein the drive electrode driver applies a display driving signal for display to the plurality of drive electrodes, and performs control so that average potential of the display driving signal is equal to average potential of the touch driving signal.

7. The display device with a touch detection function according to claim 1, wherein the plurality of touch detection electrodes detect an external proximity object approaching from the outside based on a change in capacitance caused by proximity or contact of the external proximity object.

8. The display device with a touch detection function according to claim 1, wherein the plurality of drive electrodes extend in a direction parallel to a direction along which the plurality of signal lines extend, and the plurality of touch detection electrodes extend in a direction different from a direction along which the plurality of signal lines extend.

9. An electronic apparatus having a display device with a touch detection function capable of detecting an external proximity object, the display device with a touch detection function comprising:
  a substrate;
  a plurality of pixels arranged in a matrix, each pixel including a plurality of sub-pixels, each sub-pixel including
    a drive electrode,
    a pixel electrode opposed to the drive electrode in a vertical direction orthogonal to a surface of the substrate, and
    a touch detection electrode opposed to the drive electrode in the vertical direction and capacitively coupled with the drive electrode;
  a plurality of signal lines that extend above a plane parallel to a surface of the substrate and supply a pixel signal for displaying an image to the respective pixel electrodes;
  a display function layer that exerts an image display function based on the pixel signal;
  a gate driver that applies a scanning signal for selecting the respective pixel electrodes;
  a drive electrode driver that applies a touch driving signal for touch detection or a common signal for display to the respective drive electrodes;
  a source driver that applies the pixel signal to the respective pixel electrodes; and
  a source selector unit that selects a signal line to which the source driver applies the pixel signal among the plurality of signal lines,
  wherein at least one of the pixels includes a first sub-pixel having a first pixel electrode and a first drive electrode, and a different second sub-pixel having a second pixel electrode and a second drive electrode, and
  wherein the second sub-pixel is located next to the first sub-pixel in a first direction different from a second direction along which the signal lines extend, and the first sub-pixel and the second sub-pixel are provided within a same pixel,
  when the pixel signal is provided to the first pixel electrode and the common signal is provided to the first drive electrode, the second pixel electrode is in a floating state and the touch driving signal is provided to the second drive electrode,
  thereby enabling the image display function on the first sub-pixel and the touch detection function on the second sub-pixel to occur concurrently.

* * * * *